(12) United States Patent
Wu

(10) Patent No.: US 12,119,536 B2
(45) Date of Patent: *Oct. 15, 2024

(54) ELECTROMAGNETIC TOOL USING SLOTTED POINT DIPOLE ANTENNAS

(71) Applicant: Bench Tree Group, LLC, Georgetown, TX (US)

(72) Inventor: Jian-Qun Wu, Kingwood, TX (US)

(73) Assignee: Bench Tree Group, LLC, Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,663

(22) Filed: Mar. 27, 2023

(65) Prior Publication Data

US 2023/0238680 A1 Jul. 27, 2023

Related U.S. Application Data

(63) Continuation of application No. 17/080,104, filed on Oct. 26, 2020, now Pat. No. 11,616,284.

(60) Provisional application No. 62/926,808, filed on Oct. 28, 2019.

(51) Int. Cl.
| | |
|---|---|
| *G01V 3/38* | (2006.01) |
| *E21B 49/00* | (2006.01) |
| *G01V 3/26* | (2006.01) |
| *G01V 3/30* | (2006.01) |
| *H01Q 1/04* | (2006.01) |
| *H01Q 9/16* | (2006.01) |

(52) U.S. Cl.
CPC ............... *H01Q 1/04* (2013.01); *E21B 49/00* (2013.01); *G01V 3/26* (2013.01); *G01V 3/30* (2013.01); *G01V 3/38* (2013.01); *H01Q 9/16* (2013.01)

(58) Field of Classification Search
CPC ... G01V 3/30; G01V 3/28; G01V 3/26; H01Q 1/04; E21B 49/00
See application file for complete search history.

(56) References Cited

U.S. PATENT DOCUMENTS

| | | | |
|---|---|---|---|
| 5,530,358 | A | 6/1996 | Wisler et al. |
| 5,869,968 | A | 2/1999 | Brooks et al. |
| 6,577,129 | B1 | 6/2003 | Thompson et al. |
| (Continued) | | | |

OTHER PUBLICATIONS

Notification of Transmittal of the International Search Report and the Written Opinion of the International Searching Authority, dtd Feb. 3, 2021, 13 pgs.

*Primary Examiner* — Reena Aurora
(74) *Attorney, Agent, or Firm* — DUNLAP CODDING, P.C.

(57) ABSTRACT

Slotted dipole antennas for use in an antenna system on a drill collar segment is presented. Dipoles may be placed in slots on the drill collar segment. A dipole consists of a ferrite rod with electric wires placed above and below the ferrite rod. Wires may be connected such that wire current forms a loop around the ferrite rod. When a group of slots are used for an antenna, wire holes are constructed between slots. Effectively a single wire may be used to go above all ferrite rods in the group and then turn to go below all the ferrite rods. Two wire segments are in a wire hole connecting two adjacent slots. Currents in the two segments are the same in magnitudes and flow in opposite directions. There is no net current in wires in a wire hole.

20 Claims, 12 Drawing Sheets

(56) References Cited

U.S. PATENT DOCUMENTS

| | | | |
|---|---|---|---|
| 8,378,908 B2* | 2/2013 | Wisler | G01V 3/28 |
| | | | 343/788 |
| 10,690,799 B2* | 6/2020 | Ang | G01V 3/30 |
| 11,616,284 B2* | 3/2023 | Wu | E21B 49/00 |
| | | | 324/336 |
| 11,682,821 B2* | 6/2023 | Wu | G01V 3/26 |
| | | | 702/9 |
| 11,692,437 B2* | 7/2023 | Griffing | E21B 49/00 |
| | | | 166/250.01 |
| 2004/0060708 A1 | 4/2004 | Clark et al. | |
| 2004/0061622 A1 | 4/2004 | Clark | |
| 2011/0084698 A1 | 4/2011 | Wisler et al. | |

* cited by examiner (Priot Art)

(Priot Art)

(Priot Art)

(Priot Art)

(Priot Art)

(Priot Art)

(Priot Art)

(Priot Art)

(Priot Art)

(Priot Art)

ELECTROMAGNETIC TOOL USING SLOTTED POINT DIPOLE ANTENNAS

CROSS-REFERENCE TO RELATED APPLICATIONS

The present application incorporates by reference the entire patent application identified by U.S. Ser. No. 17/080,104, filed on Oct. 26, 2020, and the entire provisional application identified by U.S. Ser. No. 62/926,808, filed on Oct. 28, 2019, and claims priority thereto under 35 U.S.C. 119(e).

BACKGROUND

In recent years, information on the property of formation traversed by a well bore is gathered during the drilling process in oil and gas wells. The information is used to evaluate the geological properties of the formation. Lately, the information is also used, often times exclusively or predominantly, for determining the position of the well section being drilled relative to the Earth formation geological structure. The positional information relative to the geology is used in deciding the next course of action in the drilling process in order to place the next section of the well in a zone of hydrocarbons to maximize production. The process of measuring formation parameters while drilling and then using the measurements to determine the formation structure relative to a borehole to aid the steering of a well is called geological steering, or geosteering. The regional Earth formation geological structure is termed formation structure or formation. Two formations are different even if the geometrical shapes are identical but one or more geometrical volumes have different geologies. Hereafter, formation properties or formation parameters comprises geological properties, geometrical structure information, and relative position between a well section and formation geological structure.

The measurement of formation properties while a well is being drilled was first called Formation Evaluation Measurement While Drilling (FEMWD). Later the term Logging While Drilling (LWD) was used.

One of the formation properties measured by a LWD system is resistivity. This parameter quantifies how difficult it is to conduct electric current in the formation. The porous space in a potential hydrocarbon bearing formation is filled with either hydrocarbon fluid or brine. Hydrocarbon fluid, namely oil and gas, is strongly resistive, while brine is conductive. By measuring resistivity, an estimation of what the percentage of porous space having oil and gas in a well section in a homogenous formation may be determined.

Wave propagation resistivity tools have been used for LWD resistivity measurement. Transmitter antennas and receiver antennas are built onto a section of a drill collar. Electromagnetic waves are transmitted from a transmitter antenna of a tool into a borehole. The wave propagates through the space including both the borehole environment and formation surrounding the borehole. The wave signal at the receiver antenna located on the drill collar some distance away from the transmitter is measured. The phase delay and amplitude attenuation of the receiver wave signal relative to those of the transmitter are obtained from the measurement of the wave signal at a receiver when one transmitter is transmitting at a frequency. The phase delay may be referred to as phase. The amplitude attenuation may be referred to as attenuation or amplitude. The phase and attenuation are functions of frequency, distance between the transmitter and receiver, the borehole geometry and its property, and the electromagnetic properties of the formation near the borehole.

In electronics, the term 'gain' is used to mean a scale factor in power level and a shift in phase. The scale factor can be larger than or smaller than 1. A gain is often represented by a complex number. In general, amplifying or attenuating systems are often used in the signal generation or signal detection processes. The gains are generated to improve signal quality and measurement accuracy. There are uncontrolled gains in transmitters and receivers which come from the antenna structure and circuitry. The uncontrolled gains can also come from errors in amplification or attenuation systems which deviate from designed behavior. Unless specifically noted otherwise hereinafter the term gain or gains means only the uncontrolled gain or gains In addition to being affected by borehole and formation parameters, the phase and attenuation measurement is also affected by gains in the transmitter and the receiver. With digital electronics, a transmitter is commanded to turn on with a known power level and phase. The actual power level and phase in the transmitter are shifted by the gain in the analog portion of the antenna that transmits electromagnetic waves. Similarly, between the wave signal at a receiver location and the analog-to-digital conversion stage of the receiver system there is a gain. The gains drift with temperature. In earlier resistivity tools with mostly analog electronics, the gains and associated shifts are even more pronounced. The nominal phase value of a transmitter signal isn't known with analog electronics. The range of frequency used by and the geometry of the antennas on resistivity tools are such that the radiation resistance of an antenna is relatively small. The uncontrolled gain variation in an antenna depends mostly on minute variations in the structure of the antenna and the properties of the electronic components and materials used in the antenna. The gain drifts greatly in the temperature range experienced by a resistivity tool. The gain can be non-repeatable from antenna to antenna and are not easily tracked and calibrated. The effects of the gains on phase and attenuation must be removed in order to extract information about formation properties.

Multiple transmitter-receiver pairs operating at one or multiple frequencies are used to create measurement combinations. Each combination is designed to be mostly sensible to a particular property of a particular region near a resistivity tool. For example, a LWD resistivity tool used in drilling operations can include one transmitter and two receivers. The two receivers are closely spaced and are some distance away from the transmitter along the axis of the tool that is part of the drill string. When the transmitter is powered on, the phase difference and amplitude ratio between the signals at the receivers are mostly sensitive to the resistivity of the formation region away from the borehole and are minimally affected by borehole properties in most situations. This desirable property is called borehole rejection in the industry.

The combinations are also used to overcome imbalances or drifts in electronics, namely the gains in transmitter and receiver antennas. The differential measurements between a pair of receivers described in the previous paragraph are unaffected directly by the transmitter power level or phase. As long as the power level is above the signal-to-noise requirement, the receiver differential measurements are free of the effects of the transmitter gain. Therefore, there is no need to calibrate the transmitter. The effect of gains common to the two receiver systems is also removed by the differential measurement. However, the gains in the two receivers may be different and drift differently with temperature. To overcome the effect of im-balances in the receivers, a second transmitter with the same frequency is placed on the side of the two receivers opposite to the first transmitter along the drill collar axis. Namely the two receivers are in between the two transmitters. The phase difference and amplitude ratio between the signals at a first receiver and a second receiver from the first transmitter are measured. Then the first transmitter is turned off and the second transmitter on the other side of the receivers is turned on. The phase difference and amplitude ratio between the signals at the second receiver and first receiver are obtained. The two phase differences in degrees and the two amplitude ratios in dBs are averaged, respectively. The phase errors caused by the difference between two receiver gains are the same in magnitude in the two phase difference measurements, but are opposite in sign. The averaging of the two phase differences completely removes the error due to receiver gain difference. The errors in amplitude ratios from the receiver gain difference are removed in a similar fashion. The averaged phase difference is called compensated phase difference, or compensated phase. The averaged amplitude ratio is termed compensated amplitude ratio, or compensated attenuation. Even though the gains in antennas differ from antenna to antenna and are very sensitive to temperature, the gain in a particular antenna within a measurement cycle is very stable. There is no measurable difference in the gain in a receiver between a first transmitter and a second transmitter transmitting sequence in a borehole environment where temperature changes slowly relative to the tool measurement cycle. The compensated measurements are free of the effects directly due to gains in either the transmitters or the receivers.

Even though the systematic errors due to antenna gains are eliminated or greatly reduced by measurement combinations such as compensated phase and attenuation, the random noise in antenna electronics can cause measurement errors. The common techniques of increasing signal-to-noise ratio and expanding signal averaging window are used in most LWD tools. An antenna is tuned to resonate at its operating frequency(s). This greatly increases the signal level and narrows noise band. The transmitter power level is constrained by the limited power supply available to the resistivity tool operation in a well. In addition, because LWD tools operate while the drill string is moving, the signal averaging window needs to be small enough so that during a measurement cycle the tool only moves by a small amount. Further increases on signal-to-noise ratio need to come from improvement in antenna design.

The raw tool measurements including measurement combinations are converted into measurements of formation properties through conversion functions. The conversion functions are the inverses of the forward tool response functions. In very limited cases, a tool response function consists of a table of experimental data. Because the structure and geology of formations encountered by a LWD resistivity tool can be very large in scale and complex, it may be impractical to build the collection of experimental setups to obtain a tool's response in all those environments. In most cases, the tool response functions or data are generated by modeling how electromagnetic waves generated by a transmitter propagates in various borehole and formation structures based on the laws of physics governing the behavior of electromagnetic waves. For each borehole and formation structure, and for every transmitter-receiver antenna pair in the tool, the receiver output is computed. The computed receiver's signals (i.e., receiver voltages or receiver currents or receiver readings) from all the antenna pairs are processed and combined in exactly the same way as what is done in a tool for each borehole and formation structure. The modeled tool responses are compared with the tool measurements. A best match is determined. The formation parameters in the model associated with the best match are deemed to be the tool measurements.

The converted measurements are the output of the LWD system. They are the tool measurements or data. The raw tool measurements such as compensated phase and attenuation are considered as intermediate results of a resistivity tool. The final tool data are derived from the intermediate results.

The impracticality of building large number of experimental setups to obtain tool response functions is one reason on why theoretic modeling is used for computing tool response function to be used for data conversion and interpretation. Another reason is that laboratory experimental setups may not accurately duplicate the environments a LWD resistivity tool experiences in a well. A LWD resistivity tool is a precision instrument. The resolution on attenuation measurement achieved by several manufacturers is 0.0002 decibels (dBs) at up to 175 degrees Celsius. This equals to 23 parts per million. As such, the amplitude measurement of a receiver voltage needs to have five effective digits in many cases. Similarly, the phase measurement also needs to have five effective digits. The accuracy of the attenuation measurement achieved by some manufacturers are less than 0.005 dBs at temperatures to 175 degrees Celsius.

In a well, a LWD tool is installed near the bottom of a drill string. For example, it can be a few meters to a few tens of meters from the drill bit at the bottom. The length of the drillstring above the resistivity tool is approximately the entire length of the well that has been drilled at the time. In zones where resistivity measurements are important, the length of a well can be a few hundred to a few thousand meters. The tool is electrically well grounded even with resistive oil-based drilling fluid in the well because the area of contact between the drillstring and the Earth is very large. In the cylindrical model used to compute tool response, the drillstring, borehole, and formations are assumed to be extending in the axial direction of the well section near the tool indefinitely in both directions. The tool is assumed to be perfectly grounded with its surroundings in the model. In terms of grounding, the model ideally matches the environment in which a LWD tool is operating during the drilling process.

In a laboratory, the Earth formation is often simulated by a tank of water. The resistivity of the water is determined by its salinity. The tank resistivity is often chosen to be at the lowest limit of the designed resistivity range. The limit often is at or close to 0.2 Ohm-M. Salt is added to the water to reach this resistivity. For a given transmitter power, the receiver signal is the lowest at this limit. The most challenging signal-to-noise-ratio point is a good test for any tool. At this resistivity the size of the tank required to simulate the infinite Earth formation is also the smallest because electromagnetic signals attenuate faster in more conductive (less resistive) medium. The tool section alone with its limited length is immersed into the middle of the tank vertically to simulate the tool in a formation as part of an almost infinitely long drillstring. Without any borehole structure, the tool surface is in good electric contact with the body of salty water in the tank. The tool section itself can be considered to be an excellent grounding rod. The tool is well grounded electrically to the water which may be otherwise poorly grounded to the Earth. This experimental setup with the lowest water resistivity may simulate the actual tool working environment in low resistivity formations. The truncated axial dimension in the drillstring or Earth formation in the setup does not directly impact the experimental outcome because the differential measurements between a pair of closely-spaced receivers is not sensitive to electromagnetic properties of the regions truncated and altered in the experimental setup. The truncated drill string and formation are replaced by air above the tank and ground beneath the tank. A functioning tool is expected to produce results that match the model prediction. This experiment is often conducted and its results are used as a quality assurance point.

To experimentally obtain the tool response in a borehole in a formation, a thin-layer plastic tube may be used to simulate a borehole. The tube is installed in the middle of a water tank vertically. A resistivity tool is placed in the middle of the tube separating the fluid inside the tube from the tank water. The fluid is acting as the drilling fluid (also called drilling mud) and the tank water is the formation. The diameter of the tube may be chosen to match the diameter of a borehole. The salinity of the fluid inside the tube is varied to produce various borehole mud resistivities used in drilling operations. This experimental setup appears to accurately simulate the tool response in a borehole in a formation or a convenient method of testing the quality of the tool measurements in a borehole; however, this is not the case.

The plastic material of a tube is an electric insulator. The thin insulator cylinder does not significantly affect the propagation of electromagnetic wave generated by a tool with axial antenna in a cylindrically symmetric environment. The insulation, however, destroys the almost perfect direct grounding of the tool with the tank water. This problem can't simply be overcome by electrically attaching one end of an electric wire to the tool and the other end to a small conducting rod immersed in the tank. A small electric resistance may still exist between the tool and the tank water. Also, this grounding problem can't be solved easily by grounding the water and the tool separately to Earth ground. The electronics used to power the tool in a lab is often grounded to Earth ground already. The tank is often made of electrically insulating material such as fiber glass. The water in the tank is not directly grounded to the Earth without using a sizable metal structure which may interfere with tool's measurement. As a precision instrument, a resistivity tool is designed to be very sensitive to small signals. In a low resistivity tank, a receiver voltage signal can be overwhelmed by noises caused by the imperfect grounding of the tool to water in a tank.

For tool responses, modeling results are more accurate than laboratory experimental data in many situations. Experimental setup can introduce noises which do not exist in the downhole environment. Models, on the other hand, can match the true environment very well.

Tool response modeling may play a critical role in all stages of a tool's life cycle. During the research and development phase, model simulations may be used to determine tool parameters such as frequency, antenna spacing, and measurement combinations. When a tool is manufactured, modeling results are compared with data from tool tests to determine the quality of a tool's performance. In tool's commercial operations, modeling and its results are used for data conversion and interpretation.

Due to complexity and intractability, some factors affecting antenna gains are not included in the modeled tool response. The effect of antenna gains on tool measurements are removed by using measurement combinations such as compensated phase differences, for example. Some tools have antenna configurations and/or measurement combinations which are not free of the effects of antenna gains. For those tools, the output-vs-temperature for each measurement is often established by subjecting the tool to a range of temperatures. The effect of temperature on each measurement is corrected based on the measurement's temperature function. The temperature correction works well for antenna systems whose gains-vs-temperature is repeatable and the temperature in real-time is accurately measured.

Even though a vast collection of borehole and formation structures can be modeled, many details of a resistivity tool construct still cannot be modeled on a computer. The structures of the antennas of a tool in a tool model are much simpler than those of the actual hardware. In addition, the electric conductivities and magnetic permeabilities of the materials used for antenna structures may not be precisely constant over the temperature range of a tool. They are also slightly different from tool to tool, and are not precisely known. The model simplification may be necessary in order to compute tool responses on a computer. The modeled tool is an approximation of the actual tool. Since modeled tool responses are used in converting raw tool measurements to final tool data, the discrepancy between a modeled tool response and that of the actual tool may cause errors in the measurement of formation properties.

In addition to ruggedness and reliability, two additional considerations in designing the antennas of a LWD wave propagation resistivity tool are efficiencies and model-tractability.

LWD tools are generally cylindrical in shape so that they can be installed into and become part of the drill string. A cylindrical structure that is the base for a LWD tool is called a sub. A direction parallel to the center line of the cylinder is the axial direction. A direction perpendicular to the centerline is termed being cross-axial or transverse.

FIG. 1 is a schematic side view of a steel sub 1 and antenna wire 4 of an antenna section of one of the earliest resistivity tools in the prior art. FIG. 2 is a section view of the structure in FIG. 1 plus components of the antenna in a plane containing the cylindrical axis of the sub 1. Generally, the steel sub 1 is an antenna section. A circumferential groove 2 is cut from the steel sub 1. Some insulating material 3 (FIG. 2) is placed around a deepest surface 6 of the groove 2 to keep the antenna wire 4 some distance away from the deepest surface 6. The antenna wire 4 is covered and protected by antenna cover 5 made of non-conducting material such as fiberglass.

In Towle, U.S. Pat. No. 5,138,263, hereinafter referred to as 'Towle', and incorporated by reference in its entirety, ferrite material with high magnetic permeability and negligible hysteresis is used as the insulating material 3 in FIG. 2. The ferrite dramatically improves the antenna efficiency.

To improve the mechanical reliability of the antenna section, several slotted steel shells are used as the antenna cover 5 in FIG. 2. The shells cover the entire circumference and are clamped onto the sub by bolts. Slots of the steel shell are along the sub axial direction.

The use of ferrites and steel shells greatly improved the reliability and efficiency of the antenna design depicted in FIGS. 1 and 2. The improvements, however, are not significant enough.

The steel shells of the antenna cover 5 can be damaged or the bolts can come loose. An antenna section still needs to be repaired and rebuilt frequently. The circumferential groove 2 in FIG. 1 weakens the mechanical strength of the steel sub 1. The weakening makes it difficult to build resistivity tools with small cylindrical diameters.

Faraday's law of induction and Ohm's law on electric conduction cause the alternating electric current in the antenna wire 4 in FIG. 1 to induce electric current underneath the antenna wire 4 on the surface 6 of steel sub 1 in the deepest part of the circumferential groove 2. As steel is highly conductive the current is in a thin layer at the surface. The induced current generally flows in the opposite direction of the current in the antenna wire 4. Thus, the induced current may be viewed qualitatively as a line current underneath the antenna wire 4 on the surface 6 of the deepest part of the circumferential groove 2, and may be approximately equal in amplitude and opposite in sign to the current in the antenna wire 4. Namely the induced current roughly forms an image of the current in the antenna wire 4. However, the total amount and distribution of the actual induced current depends on the conductivity of the steel, the gap between the antenna wire 4 and the surface 6 of the deepest part of the circumferential groove 2 in FIGS. 1 and 2. Additionally, the shape of the antenna wire 4 may not be perfectly circular and/or concentric with the steel sub 1. The presence of the ferrite between the antenna wire 4 and the surface of the steel sub 1 may also affect the induced current distribution.

For a transmitter antenna, the primary current in the antenna wire 4, the induced current in the steel sub 1, and aligned magnetic dipole in ferrite material form the transmitting source of the antenna assembly. The total impedance of a transmitter antenna is affected by the presence of the induced current in the steel sub 1. In particular the electrical resistance of the antenna assembly is a combination of the electric resistance in the antenna wire 4 and the resistance experienced by the induced current in the steel sub 1. For a given power output by the transmitter electronics circuitry, the electric current in the antenna wire 4 of a transmitter antenna is determined by the total impedance of the antenna assembly. Similarly, the current measured by receiver electronics in antenna wire 4 of a receiver antenna, is determined by the electromagnetic field at the receiver location and the total impedance of the receiver antenna assembly.

The antennas are tuned to resonate at the operating frequency. The peak of the resonance is determined almost entirely by the electric resistance of the antenna assembly because the radiation loss is small. It is important that the electric resistance of an antenna assembly is made as small as possible.

The steel sub 1 of an antenna section such as the one depicted in FIGS. 1 and 2 is modeled as being a perfect cylinder without the circumferential groove 2 cut for housing the antenna wire 4. The schematic plot of a modeled antenna section is depicted in FIG. 3.

FIG. 3 illustrates an antenna section 8 having a steel sub 9, an antenna wire 10, and a gap 11. The gap 11 is positioned between the antenna wire 10 and the surface of the steel sub 9. A transmitter serves as a perfect current source in the model. A receiver serves as a perfect sensor of voltage or electromagnetic force. Both the steel sub 9 and current of the antenna wire 10 may be assumed to be perfectly circular and are concentric. This model is termed Sleek-Collar Current-Loop (SCCL) model.

The simplification of the antenna section 8 in the model makes it possible to compute the tool response analytically in various borehole and formation environments. Because the wave length of the electromagnetic signal used by a resistivity tool is much larger than the dimension of the antenna section 8, the simplification used in the model is justified for differential measurements between two receivers. However the justification is based on the antenna wire 10 being perfectly circular and concentric with the steel sub 9. In reality, the shape of the antenna wire 10 may be different from that of the model. The distribution of the induced current in the steel sub 9 may be different from the model prediction. This is a source of error.

The tool response is sensitive to the conductivity of the steel sub 9 even if the antenna wires 10 are perfectly circular and concentric. The size of the gap 11 between the antenna wire 10 and the surface of the steel sub 9 underneath may also affect the tool response. So the conductivity of the steel and the gap must be accounted for precisely in the model used to compute the tool response. Thus inaccuracies in manufacturing processes and inconsistencies in materials cause resistivity measurement error.

The type of antenna depicted in FIG. 1 has at least three major short comings. First, the steel sub 1 (antenna section) may be easily damaged. Second, the induced current in the steel sub 1 experiences a higher electric resistance than that of the antenna wire 4 made of copper, limiting the antenna efficiency. Third, the distribution of the induced current is sensitive to the details of antenna structure and the properties of the materials used in the antenna section. The distribution is often unknown and is not correctly-accounted for in a model, potentially causing resistivity measurement errors.

The antenna reliability was greatly improved in a design by Wisler et al., U.S. Pat. No. 5,530,358, hereinafter referred to as 'Wisler design', or 'Wisler antenna'), and incorporated by reference in its entirety.

FIG. 4 is a schematic and non-proportional side view of an antenna section 13 using the design by Wisler et al. The antenna section 13 includes a steel structure 14. Slots are cut in parallel to the axis of the tool cylinder and are approximately evenly distributed circumferentially. Nine slots are viewable in FIG. 4. Only one slot is shown with label 15 in FIG. 4 for simplicity. "A slot 15" or "a slot" means any of the nine slots shown and the slots not shown. "Slots 15" refers to the collection of all the slots. Wire holes are pathways in the steel structure 14 between slots 15. The label 31 refers to a single section of wire hole connecting two adjacent slots. For simplicity only one wire hole is labeled 31 in FIG. 4. But "a wire hole 31" or "a wire hole" is used to refer to any of the wire holes. "Wire holes 31" refers to the collection of all the slots. Slots 15 and wire holes 31 form a circumferential pathway for antenna wire (not shown).

FIG. 5 is a cross-sectional view of the antenna section 13 in a plane that is perpendicular to the cylindrical axis of the antenna section 13 and is at the antenna wire 32 in a Wisler antenna. The antenna wire 32 in FIG. 5 is illustrated as a dashed line. Wire holes 31 are positioned at a distance away from the surface of the sub. The insulating material 33 may include a magnetic ferrite rod positioned in the section (e.g., bottom section) of a slot 15 under the antenna wire 32. The insulating material 33 (e.g., a ferrite rod) may be made of high magnetic permeability material without hysteresis. Even though only one label 33 is shown in FIG. 5 for simplicity the label applies to all 16 pieces of the insulating material. Filler material 49 that is non-conductive and non-magnetic is used to fill the space in the slots 15 above the antenna wire 32 for protection of the antenna. A wire passageway 65 provides access for the antenna wire 32 to electronic circuitry. Here, an object A being above or over an object B in the slot 15 means that A is radially closer to the surface of a sub than B. Conversely object A being under or beneath object B indicates A is radially closer to the center line of a sub than B.

FIG. 6 is an expanded view of antenna wire 32 and ferrite rods 33. The steel structure and other components in the antenna structure are not shown in FIG. 6. Wire segments 66 and 67 connect the antenna wire 32 to and from an electronic circuitry 68. The antenna wire 32 and wire segments 66 and 67 may be made of a single continuous wire. The wire segments 66 and 67 may be twisted. The currents in wire segments 66 and 67 have substantially the same amplitude and are opposite in direction. The wire segments 66 and 67 together may not materially contribute to the receiving or transmitting function of the antenna structure, especially when well-twisted.

Referring to FIG. 5, for a transmitter antenna, the current in antenna wire 32 forms a current loop. The current induces currents at the bottom of the slots under ferrite rods, walls of wire pathway 31, side walls of slots, and surface of the antenna sub. The total strength of the induced current in the azimuthal direction is approximately equal to that of the antenna wire 32 as in the case for an antenna depicted in FIGS. 1 and 2. Even though the main antenna transmitting power comes from the ferrite rods, the induced current is still a factor. The electric resistance encountered by the induced current is also important in limiting the height of antenna resonance.

The Wisler design is one of the strongest antenna structures, and almost eliminates the need for mechanical maintenance and repair of the antenna sections. Mechanically the antenna structure is easy to make. There is still substantial induced current in the steel structure around the antenna wire. The electric resistance in steel still limits the height of the resonance of the tuned antenna assembly. More importantly the distribution of the induced current is still not explicitly accounted for in a model. The distribution may vary from antenna to antenna and from tool to tool due to the variation in steel conductivity and the details of the antenna construct. Usually the model used for tool response in a borehole environment, data processing and log interpretation is the sleek-collar loop current model (SCLC) depicted in FIG. 3.

In Wu, (U.S. Pat. Nos. 5,331,331 and 5,491,448, both herein incorporated by reference in their entirety), each antenna is made of one or more magnetic dipoles (Point dipole antenna, or Wu antenna). The dipoles are placed in pockets cut on the surface of steel sub. Each magnetic dipole consists of or can be thought of as an electric current loop. In particular, a dipole is made of a current wire wrapped around a ferrite rod with high magnetic permeability. The current loop in this case is much smaller than the diameter of the steel sub and the wave length of the electromagnetic wave used in resistivity tools. The dipole induced current in the steel sub is much smaller than that of the circumferential current loop around the steel sub as in the Wisler design or the groove structure depicted in FIG. 1 if the currents in the dipole and in the circumferential loop are the same. Smaller induced current means that the conductivity of the steel sub plays a smaller role in antenna efficiency. In turn, proper modeling of the detailed distribution of the induced current becomes less important. A simplified structure for antennas can be used to approximate the real antenna in a model so that model computations can be carried out. The axial antenna section of a model used for tool response in homogenous media or a borehole environment for an antenna consisting of three point dipoles is depicted in FIG. 7.

In FIG. 7, an axial antenna section 69 includes a steel sub 70 that extends in both directions with constant outside-diameter. Magnetic point dipoles 71, 72 and 73 are in the axial direction of the steel sub 70. There exists a distance d between the surface of the steel sub 70 and the magnetic point dipoles 71, 72 and 73. This antenna is termed Sleek-Collar Point-Dipole (SCPD) model. Point-dipole antennas in non-axial directions are also modeled by SCPD. For aforementioned reasons, SCPD models tool response with point-dipole antennas much better than SCLC does with Wisler design.

There exists a need within the art for an antenna for a LWD tool with efficiency and model tractability, while ensuring mechanical structure integrity, manufacturability and/or zero-maintenance.

BRIEF DESCRIPTION OF THE DRAWINGS

Like reference numerals in the figures represent and refer to the same or similar element or function. Embodiments of the present disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
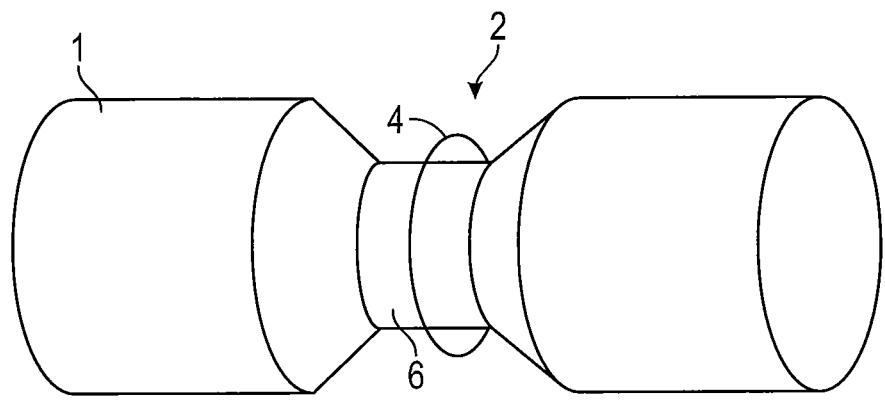
FIG. 1 is a schematic side view of a prior art steel structure and antenna wire of an antenna section.
Figure 2:
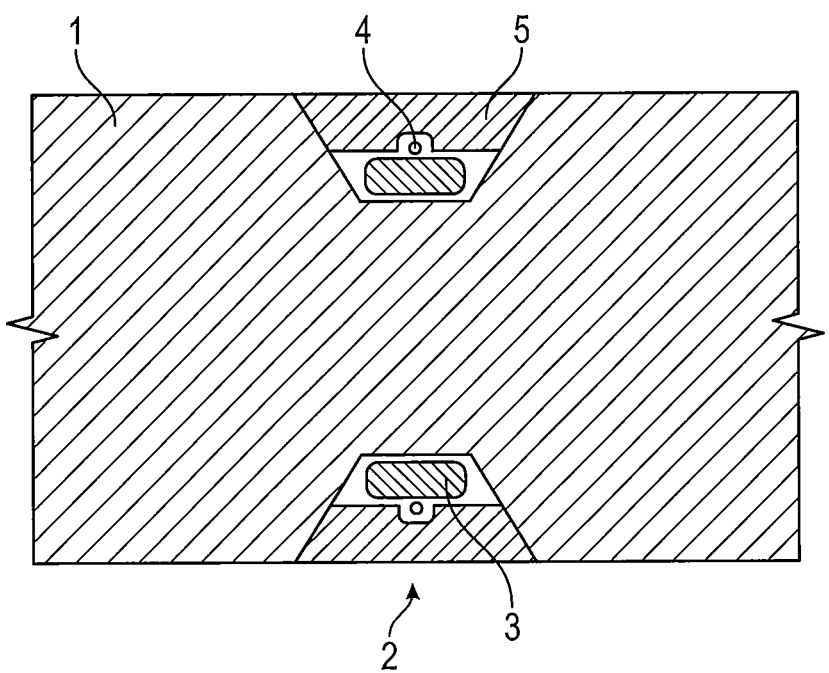
FIG. 2 is the section view of the structure in FIG. 1 having components of the antenna in a plane containing a cylindrical axis of a sub.
Figure 3:
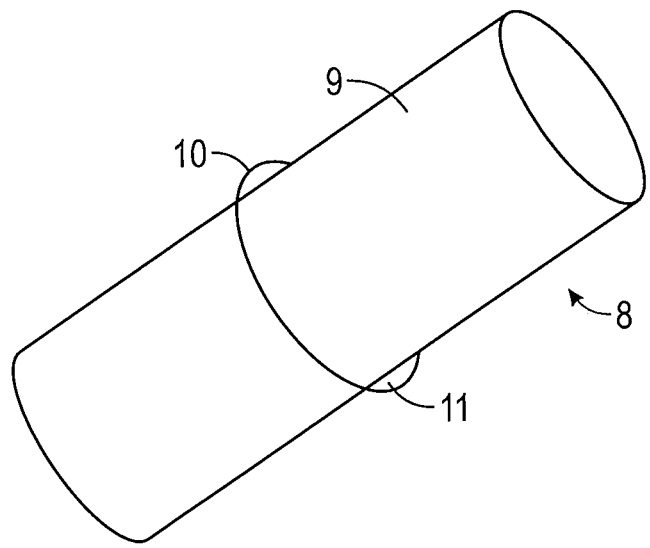
FIG. 3 is a schematic view of a model used for antennas depicted in FIGS. 1 and 2.

Generally, multiple slots are cut around the surface of an antenna section. For axial antennas, the slots are in the direction of a cylindrical axis of a tool and are distributed circumferentially. Beneath a sub-surface, wire holes perpendicular to the slots are made to connect the slots, forming a circumferential wire passageway. Highly magnetically-permeable ferrite rods are positioned in the slots. An antenna wire is positioned in a first direction around in a wire path above the ferrite rods. The antenna wire is then positioned in a second direction in an opposite direction of the first position such that the antenna wire is underneath the ferrite rods. Net current in a wire hole connecting two adjacent slots is zero. The net current around each ferrite rod forms a closed loop. Each ferrite rod may act as a point dipole. A group of point dipoles forms an antenna. The slot structure makes the antenna structure durable. Electric current in and around wire holes and slots induced by antenna current is much smaller than that of any prior art antenna structure. The antenna efficiency is improved. The antenna response is well tracked by a model with point-dipole antennas. An antenna in a non-axial direction can be made by a group of slots cut on the sub surface in a pre-designed direction. Wire holes, ferrite rods, and antenna wire are arranged in a way similar to that of axial antenna.

Before explaining at least one embodiment of the present disclosure in detail, it is to be understood that embodiments of the present disclosure are not limited in their application to the details of construction and the arrangement of the components or steps or methodologies set forth in the following description or illustrated in the drawings. The inventive concepts in the present disclosure are capable of other embodiments or of being practiced or carried out in various ways. Also, it is to be understood that the phraseology and terminology employed herein is for the purpose of description and should not be regarded as limiting.

In this detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, language such as "including," "comprising," "having," "containing," or "involving," and variations thereof, is intended to be broad and encompass the subject matter listed thereafter, equivalents, and additional subject matter not recited or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes slight variations or deviations therefrom, caused by measuring error, manufacturing tolerances, stress exerted on various parts, wear and tear, or combinations thereof, for example.

The use of the term "at least one" will be understood to include one and any quantity more than one, including but not limited to each of, 2, 3, 4, 5, 10, 15, 20, 30, 40, 50, 100, and all integers therebetween. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Circuitry, as used herein, could be analog and/or digital components, or one or more suitably programmed microprocessors and associated hardware and software, or hard-wired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily referring to the same embodiment, although the inventive concepts disclosed herein are intended to encompass all combinations and permutations including one or more features of the embodiments described.

In the present disclosure, LWD may mean both FEMWD and LWD. FEMWD is the measurement of formation properties while a well is being drilled. LWD stands for Logging While Drilling.

A resistivity tool within the present disclosure refers to a LWD wave propagation resistivity tool exclusively unless specified otherwise.

Figure 5:
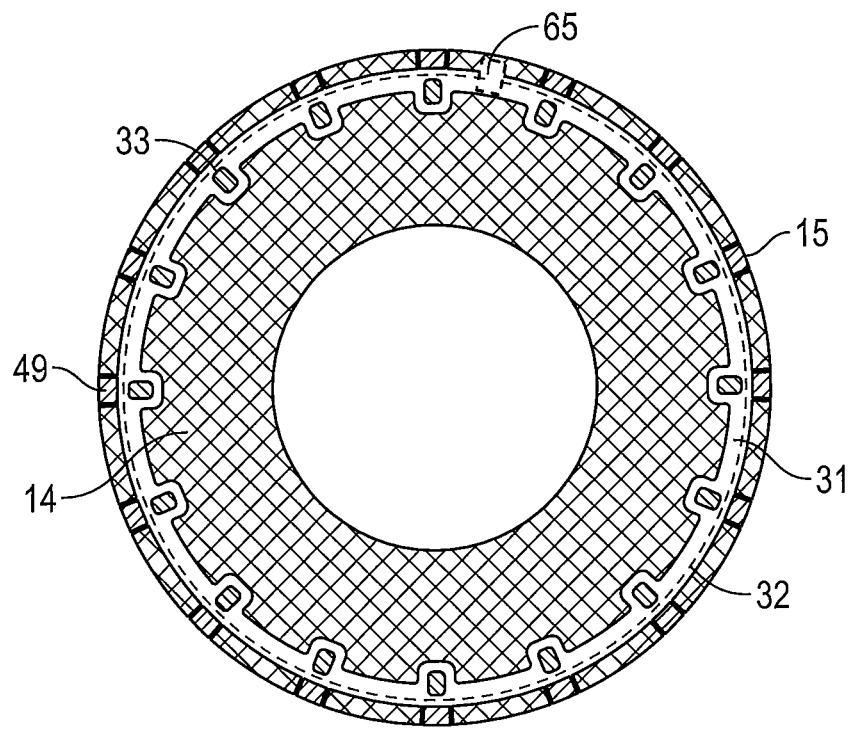
FIG. 5 is a cross-sectional view of the antenna structure at the antenna wire.
Figure 6:
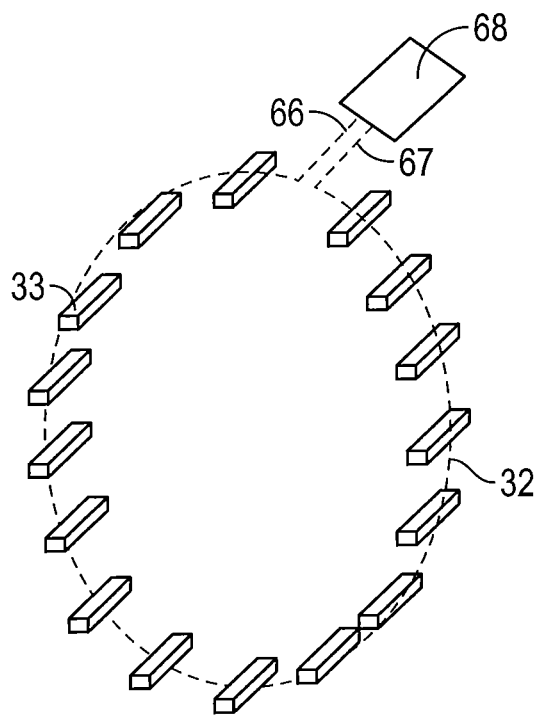
FIG. 6 is a schematic expanded view of antenna wire and ferrite rods of FIG. 5.
Figure 7:
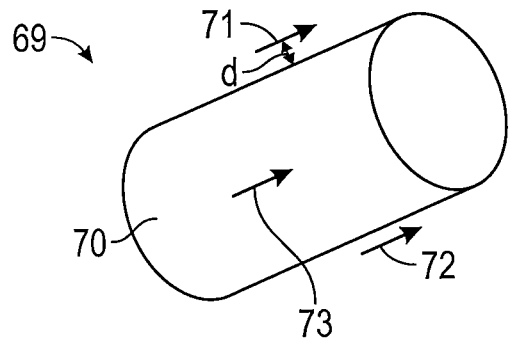
FIG. 7 is an axial antenna section of a prior art model used for point-dipole.
Figure 8:
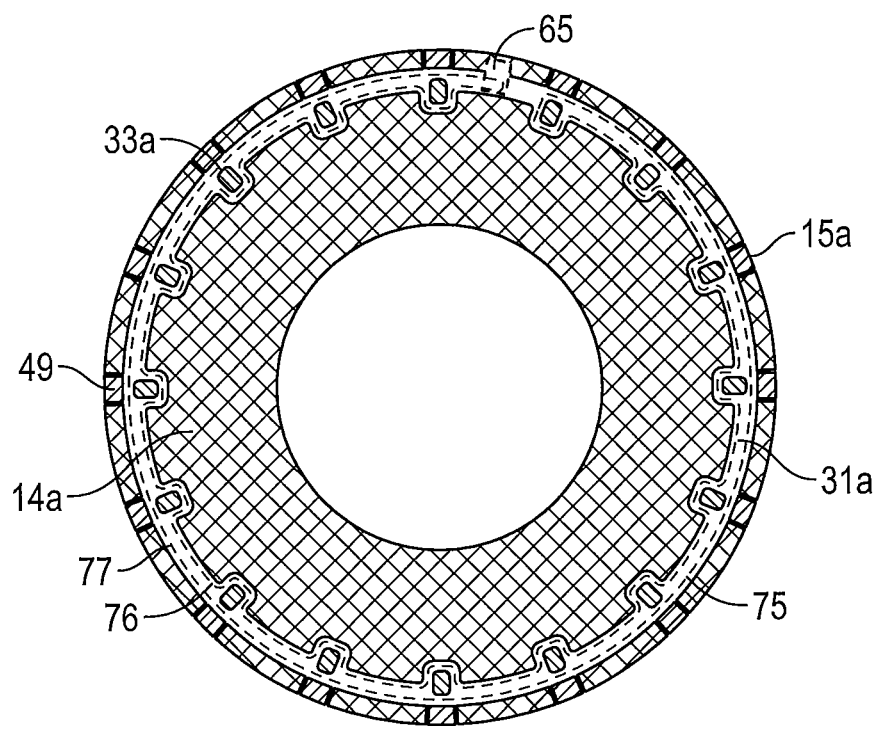
FIG. 8 is a schematic cross-sectional view of an antenna wire section of an antenna using an embodiment of the current disclosure.

Referring to FIG. 8, illustrated there in is a schematic cross-sectional view of an exemplary embodiment of antenna wire 75 of an antenna section in accordance with the present disclosure. The view is in a plane that is perpendicular to the cylindrical axis of the antenna section and the plane is at the location of the antenna wire 75. There are sixteen slots in FIG. 8. Only one is labeled explicitly 15a for simplicity. "A slot 15a" may refer to any one of the sixteen. Similarly one label 33a and one label 31a are explicitly shown in FIG. 8 for any of the sixteen ferrite rods and any of the sixteen wire hole sections, respectively. The antenna wire 75 goes above every ferrite rod 33a. This section of antenna wire 75 is similar to antenna wire 32 illustrated in FIG. 5. The antenna wire 75 turns around and goes underneath every ferrite rod 33a in the opposite direction. Two wire segments 76 and 77 of the antenna wire 75 are in a wire hole 31a between two adjacent slots 15a. Even though a pair of wire segments in only one wire hole is labeled 76 and 77, respectively in FIG. 8 for simplicity every pair of wire segments in every one of the 16 wire holes are referred to as 76 and 77. The currents in a pair of wire segments 76 and 77 are the same in amplitude but opposite in direction, for example. In should be noted, the wire segments 76 and 77 may be closer and tightly bound together within the wire hole 31 than what is illustrated in FIG. 8. The net current in a wire hole 31a connecting two adjacent slots 15a is zero. During the manufacturing process, one portion of the antenna wire 75 (e.g., the bottom portion) may be laid first threading the slots 15a and wire holes 31a. Then, the ferrite rod 33a may be placed in the slot 15a on top of the sections of wire 75 already in the slot 15a. Finally, the antenna wire 75 turns around and goes around through the wire hole 31a and on top the ferrite rod 33a. The antenna wire 75 can be made of a single continuous wire section or multiple wire sections electrically connected together in sequence.

Figure 9:
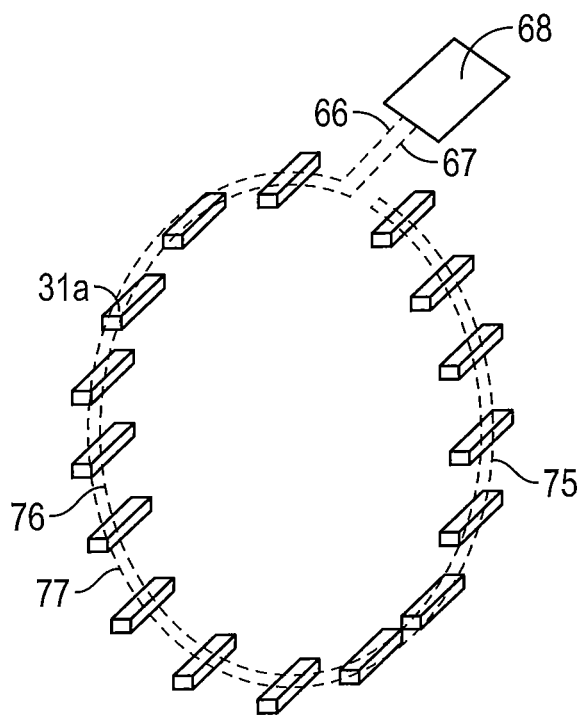
FIG. 9 is an expanded view of antenna wire and ferrite rods of FIG. 8.

The expanded views of the antenna wire 75 and ferrite rods 33a of FIG. 8 are schematically shown in FIG. 9. Referring to FIGS. 8 and 9, wire segments 76 and 77 are positioned in a section of the wire hole 31a between two adjacent slots 15a with ferrite rods 33a. It should be noted that the wire segments 76 and 77 may be more tightly positioned than what is illustrated within FIGS. 8 and 9. For example, in some embodiments, outer claddings of the wire insulation of the two wire segments 76 and 77 may touch each other. The antenna wire 75 may also be positioned closer to the ferrite rods 33a than what is illustrated in FIGS. 8 and 9.

Figure 10:
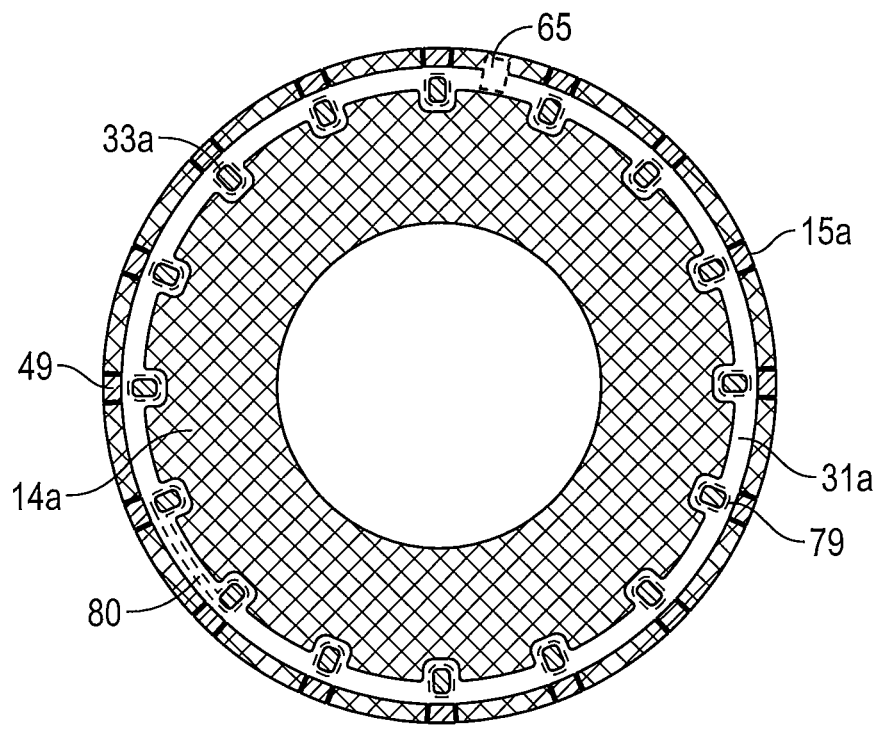
FIG. 10 is a schematic cross-sectional view of the net current of an antenna wire section of an antenna with an embodiment of the current disclosure.

FIG. 10 is a cross-sectional view of net current 79 of the antenna wire 75 illustrated in FIG. 8. The wire segments 76 and 77 in a wire hole 31a carry equal amount of currents in opposite directions. The net current 79 in the wire segments 76 and 77 in any wire hole 31a is zero. The net current 79 around each ferrite rod 33a forms a closed loop encircling the ferrite rod 33a. Ferrite rod 33a then becomes a point-dipole. A separation between the wire segments 76 and 77 in the wire hole 31a causes the formation of a closed current loop 80 in the wire hole 31a as shown in FIG. 10. The separation, however, is limited by the diameter of the wire hole 31a. Therefore, the encircled area by the closed current loop 80 means the net current 79 is small, such that the magnetic dipole moment associated with the closed current loop 80 is negligible relative to the dipole moment of the ferrite rod 33a with a high magnetic permeability. It should be noted that the closed current loop 80 around the ferrite rod 33a does not have to be tightly wrapped around the ferrite rod 33a as illustrated in FIG. 10. The closed current loop 79 can loosely encircle the ferrite rod 33a. Magnetic dipole moment of the ferrite rod 33a is insensitive to how tight the closed current loop 79 is about the ferrite rod 33a. As such, there is no need to impose restrictions on how the wire segments 76 and 77 are positioned about the ferrite rod 33a during a manufacturing process.

The point-dipoles may point in the same direction as shown in FIGS. 8, 9, and 10, acting coherently. The collection of all the magnetic point dipoles forms a composite magnetic dipole in the axial direction. This composite dipole is an axial antenna. Hereafter, parallel slot-based dipoles are called in phase when pointing at the same direction among themselves. Two groups of parallel dipoles are completely out of phase when at any moment the direction of a dipole from one group is opposite to the direction of a dipole from the other group. For a group including subgroups of parallel dipoles at different orientations, the group is in phase if each subgroup at an orientation is in phase.

Wu antenna includes designs for non-axial antenna made of a collection of coherent point-dipoles pointing in a desired direction. Wisler et al., (U.S. Pat. No. 9,885,800, herein referred to as Wisler 2006, and incorporated by reference in its entirety), teaches the designs of cross-axial and other non-axial antennas with slot and slot-like structures (Wisler 2006).

Figure 4:
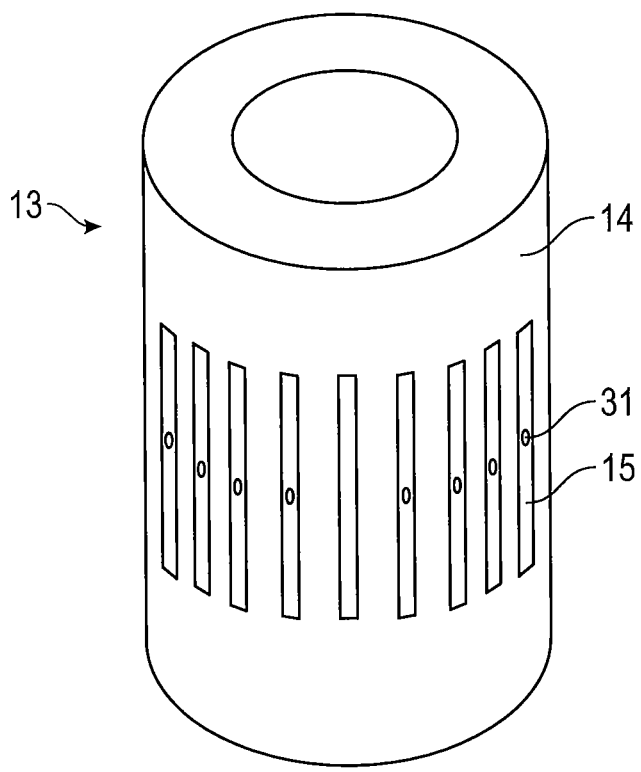
FIG. 4 is a schematic and non-proportional side view of an antenna section in a prior art design by Wisler et al.
Figure 11:
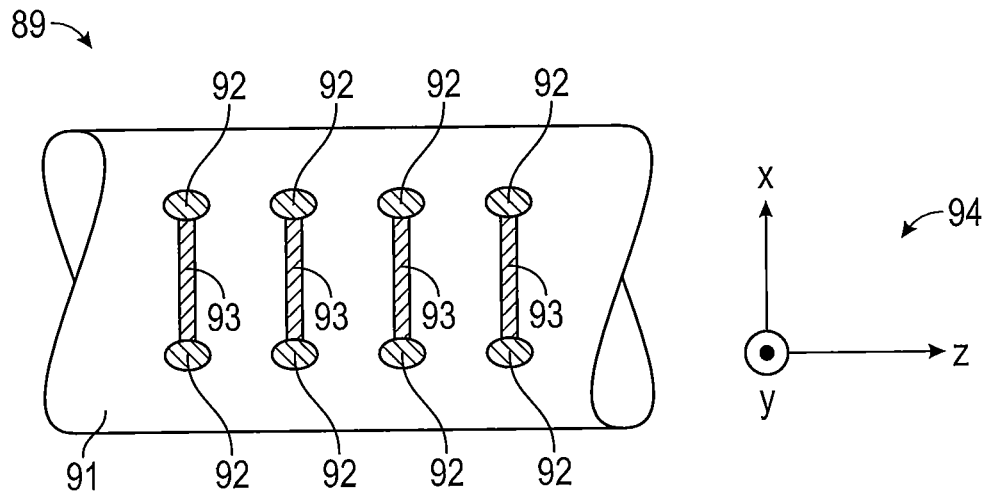
FIG. 11 is a schematic side view of the steel structure of a cross-axial antenna section.

FIG. 11 is a prior art cross-axial antenna section 89 including a steel structure 91 as described by Wisler 2006. The coordinate system 94 shows that the Z-axis is a center axis of the steel structure 91. The Y-axis of the coordinate system 94 is directed outward. A plurality of holes 92 on the steel structure are positioned in the X-direction of the coordinate system 94. The plurality of holes 92 are connected by slot openings 93 on the steel structure. Generally, the slot opening 93 must be narrower than the opening of a typical axial slot such that non-conductive material filling the slot opening 93 is not damaged by the abrasive drilling mud while the tool is rotating. The hole 92 is created by drilling through on the sub surface of the steel structure 91 in the X-direction. The diameter of each hole 92 is larger than the width of the surface opening of the adjacent slot opening 93 so that a sizable ferrite rod can be placed in the hole 92. The dipole moment of a ferrite rod is proportional to its cross sectional area. The dipole moment of the ferrite rod is insensitive to the cross-sectional shape. The use of ferrite rods with rectangular and round cross-sections for axial and cross-axial antennas, respective, is simply due to how the slot(s) 15 and hole(s) 92 are machined. Even though the geometries of an axial slot 15 in FIG. 4, 5 or 15a in FIGS. 8, 10 and a combination of the hole 92 and the slot opening 93 are different, each may function as a slot. Hereafter, a combination of one hole 92 and one adjacent slot opening 93 is referred to as a slot.

The actual width of the slot opening 93 can be made smaller than what is shown in the schematic view of FIG. 11. The slot opening 93 can be cut with the smallest mechanic knife in the machining process, for example. Because of the low frequency (<=10 MHz) used in LWD resistivity tools, the capacitive impedance of the slot opening 93 is very large. For example, there is no closed loop for induced current to kill the ferrite signal.

Figure 12:
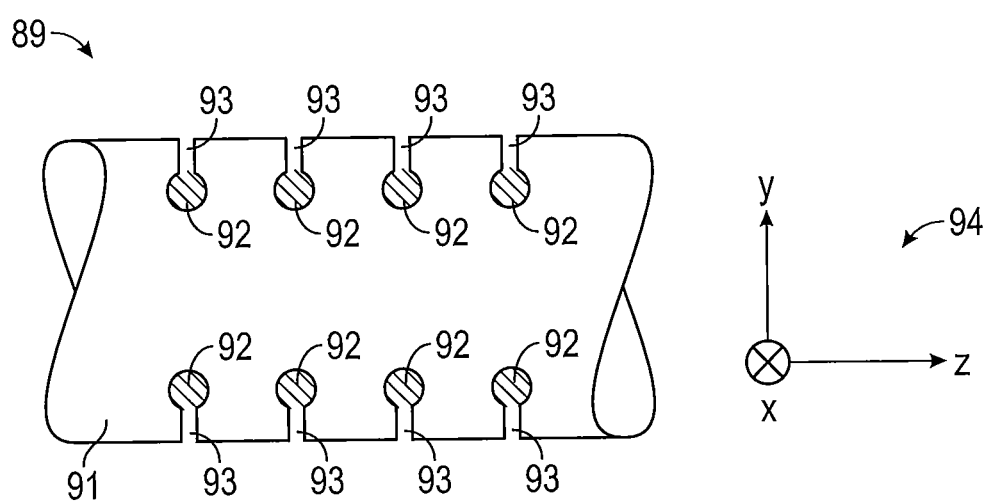
FIG. 12 is a schematic view of the antenna section illustrated in FIG. 11 rotated 90 degrees about its cylindrical axis.

FIG. 12 is another side view of the prior art steel structure 91 illustrated in FIG. 11. In this view, the steel structure 91 is rotated 90 degrees about its cylindrical axis from the position in the cross-axial antenna section 89 of FIG. 11. The X-axis of the coordinate system 94 is pointing into the paper.

Figure 13:
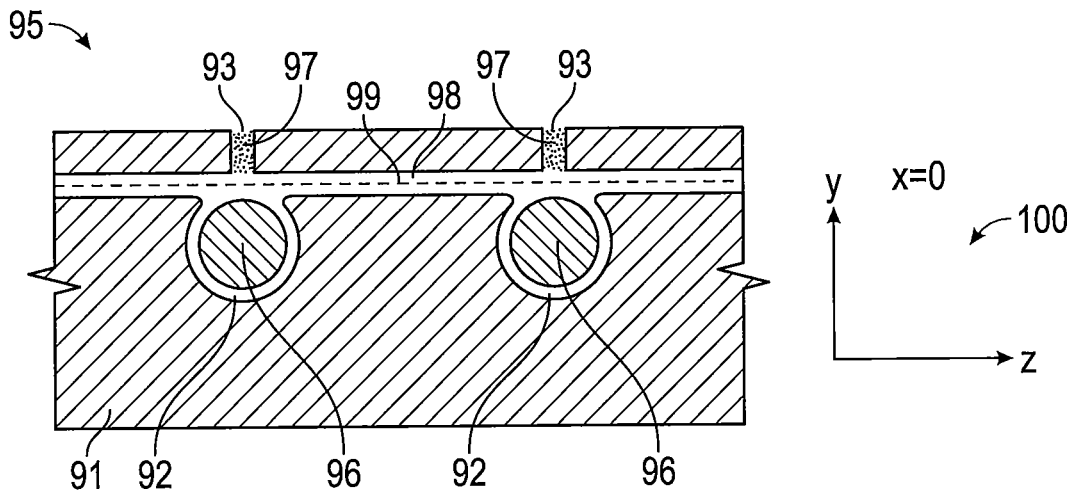
FIG. 13 shows a section view of a prior-art cross-axial antenna in a plane containing the tool major axis and being perpendicular to the axis of the cross-axial antenna.

FIG. 13 illustrates an expanded view 95 on a section of the antenna section 89 of FIG. 12. The coordinate system 100 is at the X=0 plane in the coordinate system 94 in FIGS. 11 and 12. The antenna 95 includes ferrite rods 96, wire holes 98 and antenna wire 99. Non-conductive and non-magnetic material 97 is positioned within slot openings 93. Similar to the axial antenna of Wisler design, electric current is induced in walls of the steel structure 91 around the ferrite rod 96 and in the wire hole 98. As in the case of axial antennas, the dominant transmitting or receiving power comes from the ferrite rods 96. The induced current still plays a role in the transmission or receiving function of the antenna 95. The steel conductivity plays a big role in impedance of the antenna 95. The details of geometry of the ferrite rods 96 and wire placement in the wire hole 98 influence the distribution of the induced current and impedance of the antenna 95. The induced current is thus not well tracked by models used to compute tool response in various borehole and formation environments.

Figure 14:
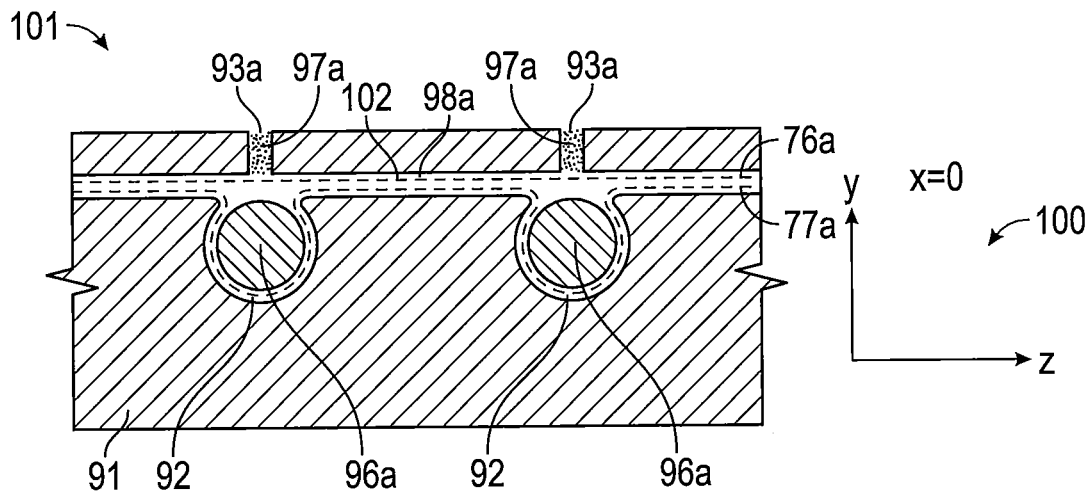
FIG. 14 shows a section view of a cross-axial antenna in a plane containing the tool major axis and being perpendicular to the axis of the cross-axial antenna.

FIG. 14 is an exemplary embodiment of a cross-axial antenna 101. An antenna wire 102 is positioned about ferrite rods 96a in opposite directions. Two wire segments 76a and 77a in a wire hole 98a connect two adjacent slots 93a. Currents in the two wire segments 76a and 77a are substantially equal in magnitude and opposite in directions. Net current in the wire hole 98a between slots 93a is zero.

Figure 15:
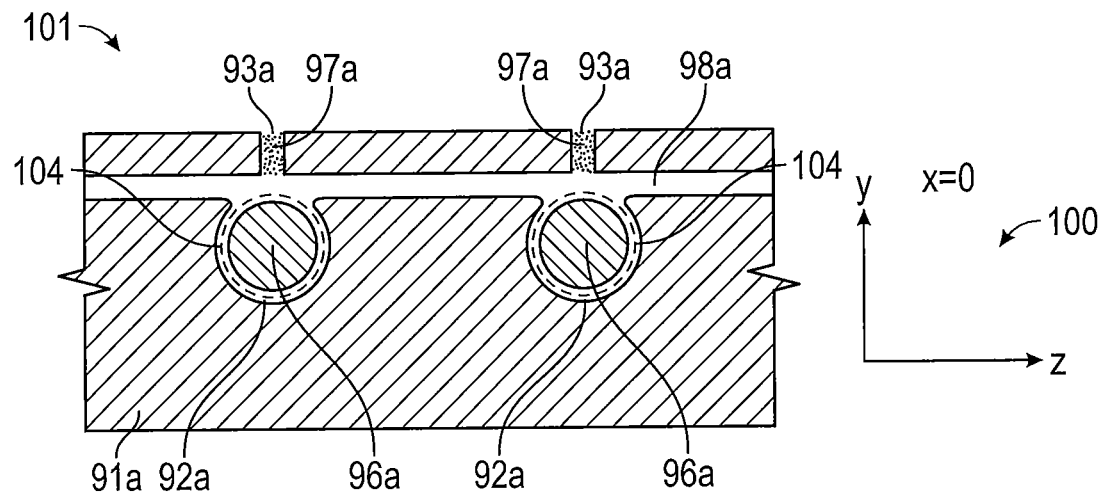
FIG. 15 shows a section view of the net current in antenna wires in a cross-axial antenna in a plane containing the tool major axis and being perpendicular to the axis of the cross-axial antenna.

FIG. 15 is a schematic view of the cross-axial antenna 101 illustrating net current 104. Net current 104 about each ferrite rod 96a forms a closed loop around the ferrite rod 96a. Each ferrite rod 96a becomes a point dipole. As such, a collection of point dipoles forms a cross-axial antenna.

Figure 16:
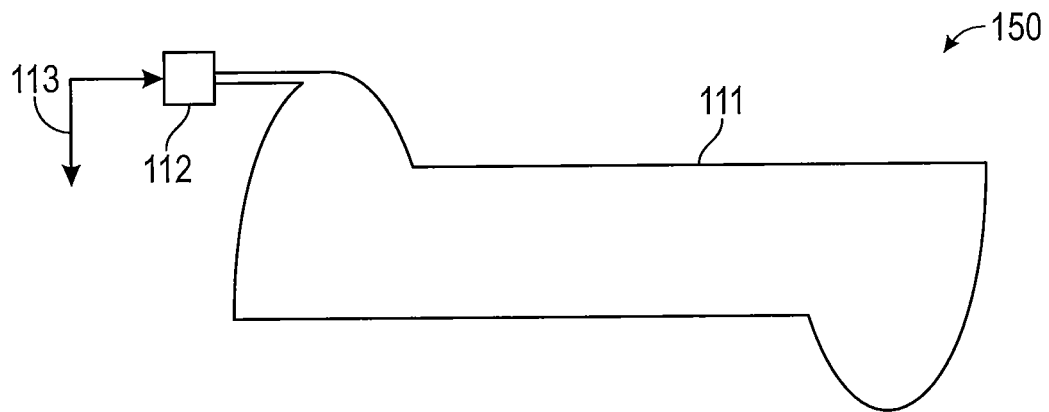
FIG. 16 is a schematic diagram of one half of an antenna wire in a prior art axial and cross-axial combination antenna.

FIG. 16 is a schematic antenna wire diagram for one half of the X-Z antenna combo 150 in Wisler 2006. The antenna wire 111 consists of two half circles and two straight lines. A tuning circuit 112 is connected to a Trans-Receiver Circuit (not shown) via a connector 113. Ferrite rods (not shown) are placed in slots perpendicular to the antenna wire 111 in both circular and straight sections. Every ferrite rod is in between the segment of the antenna wire 111 in the slot (not shown) and the steel bottom of the slot. The steel structure, ferrite rods, non-conducting material filling the slot between the antenna wire 111 and the surface of the antenna sub are not shown so that the general wire route can be clearly depicted. The diagram of the antenna wire of the other half of the X-Z antenna combo is very similar. The main transmitting or receiving power comes from the ferrite rods. Wire segments not in slots as well as the steel structure still affect antenna power. The wires from the two halves are connected to the single Trans-receiver Circuit. The Trans-Receiver Circuit operates the two halves simultaneously in a desired mode.

Figure 17:
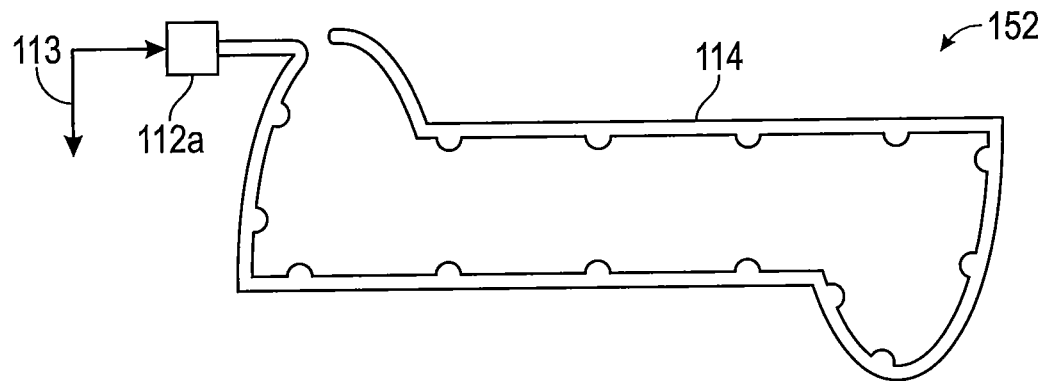
FIG. 17 is a schematic diagram of one half of an antenna wire in an axial-cross-axial combination antenna.

FIG. 17 is a schematic wiring diagram of one half of an X-Z antenna combo 152. The antenna wire 114 goes through a route below ferrite rods (not shown) and then turns around to go through the route again in an opposite direction above the ferrite rods. The net current is zero everywhere except in any slot (not shown) where a ferrite rod is sandwiched between the two opposite wire segments in a slot. The net current around a ferrite rod forms a closed loop. Only ferrite rods and immediate surroundings perform the transmitting or receiving function of the antenna. Wire-hole sections connecting slot-to-slot and slot-to-electronics do not participate in transmitting or receiving function directly. The SCPD model, not having wire hole sections, simulates this antenna structure.

The tuning circuit 112a illustrated in FIG. 17 may be similar to the tuning circuit 112 in FIG. 16. In some embodiments, the tuning circuit 112a may include different electronic components such as capacitors as antenna wire 111 in FIG. 16 and antenna wire 114 in FIG. 17 may have different inductances.

In some embodiments the antenna mechanical structures and structures for housing antenna tuning circuits and transceiver circuit as well as wire pathways between different locations may be very similar to those of prior art. Existing tools may be upgraded to include an embodiment of the current invention with no or small modifications in mechanical structures.

The structure that includes slots and wire holes for both halves of the X-Z antenna combo 152 is hereafter termed an X-Z steerable antenna structure or simply a steerable antenna structure. The slot and wire hole locations and orientations are also hereafter referred to being in a steerable antenna pattern. Hereafter, the wire route in FIG. 17, and a similar route for the other half of the X-Z antenna combo 152, are referred to as being steerable antenna routes.

Figure 18:
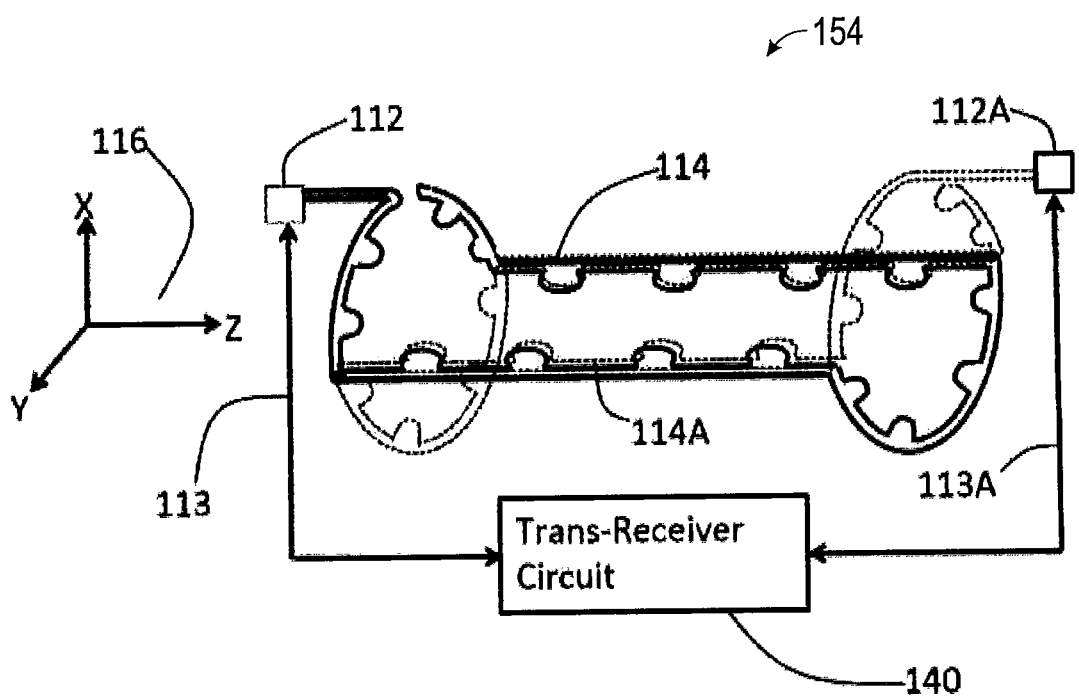
FIG. 18 is a schematic diagram of two halves of an antenna wire in an axial-cross-axial combination antenna.

FIG. 18 depicts the two antenna wires 114 and 114a for both halves of an X-Z steerable antenna 154 in steerable routes. The directions of X and Z are defined in coordinate system 116. The Z-axis coincides with a cylindrical axis of the segment of the X-Z steerable antenna 154. The cross-axial slots (not shown) are in the X-direction. Generally, the route of the second antenna wire 114a is the first wire 114 rotated about the tool cylindrical axis by 180 degrees except the locations where the antenna wires 114 and 114a connect to tuning circuit 112 and 112a. Both antenna wires 114 and 114a connect to the trans-receiver circuit 140 via connectors 113 and 113a, respectively. The cross-axial ferrite rods (not shown) positioned in the straight sections in FIG. 18 are powered (if the X-Z steerable antenna 154 is a transmitter) or sensed (if the X-Z steerable antenna 154 is a receiver) by both antenna wires 114 and 114a. The net current around a cross-axial ferrite rod forms two closed loops from the two antenna wires 114 and 114a. There are four wire segments in each wire hole connecting two adjacent cross-axial ferrite rods. Two of the wire segments come from the first antenna wire 114 and the other two segments come from the second antenna wire 114a. The net current in the wire hole is zero. Any axial ferrite rod in a circular section is powered or sensed by one wire. The net current in an axial ferrite rod forms one closed loop. One half of the axial ferrite rods on one complete circular section are powered or sensed by one wire and the other half by the other wire.

As a transmitter the X-Z steerable antenna 154 can be made to be a pure axial dipole or a pure cross-axial dipole or a slant dipole pointing in a direction between Z and X. If the current amplitudes are the same in the two antenna wires 114 and 114a (zero relative amplitude, or unit amplitude ratio) and the phases are such that the two closed net current loops around a cross-axial ferrite rod are exactly 180 degrees out of phase, then the total net current around a cross-axial ferrite rod is zero. The net currents on all the axial ferrite rods are the same and are in phase. The transmitter is a pure axial magnetic dipole antenna. If the two closed net current loops on a cross-axial ferrite rod are in phase, then the net current loops around axial ferrite rods powered by the first antenna wire 114 are 180 degrees out of phase with those of the second antenna wire 114a. One half of the axial ferrite rods on a half circle are 180 degrees out of phase with the other half. If the amplitude ratio between the two wire currents is one, then the net axial dipole moment for each circle is zero. The axial ferrite rods on one circle forms a quadrupole. A second quadrupole is formed from the other circle of axial ferrite rods. The two quadrupoles are completely out of phase. The total quadrupole moment is also zero. The two quadrupoles are separated by the distance between the two circles. There is a small octupole that has a negligible effect on the antenna. The transmitter behaves as a cross-axial magnetic dipole antenna.

The phase of a transmitting ferrite rod without hysteresis is that of the wire current. The relative phase between the magnetic dipole components excited by the two wire currents is that of the two wire currents. The collective magnetic dipole in a cross-axial direction in the X-Z steerable antenna 154 depicted in FIG. 18 is:

$$M_x = C\ I_1[\sin(\omega t) + B\ \sin(\omega t + \varphi)] \quad (\text{EQ. 1})$$

wherein x is the cross-axial axis defined by the cross-axial slots in the X-Z steerable antenna 154, $I_1$ is the current in wire 114, $M_x$ is the magnetic dipole moment in the x direction, product $C\ I_1$ is the amplitude of the total magnetic dipole moment in the x-direction powered by the current in antenna wire 114, B is the amplitude ratio of current in wire 114a over current in wire 114, $\omega$ is the current frequency, sin( ) is the sine function, and $\varphi$ is the relative phase between the two currents.

Each cross-axial ferrite rod is powered by both a first current and a second current. The first term on the right hand side of EQ. 1 is the magnetic dipole generated by the first current. The second is by the second current. Without a loss of generality, the phase of the collective cross-axial dipole is defined as being relative to that of the first current. As such, the phase of the first term is zero and the phase for the second term is the relative phase between the two terms.

EQ. 1 can be rewritten as:

$$M_x = C\ I_1 \sqrt{1+B^2+2B\cos(\varphi)}\ \sin\{\omega t + A\ \text{TAN}\ 2[B\ \sin(\varphi), 1+B\ \cos(\varphi)]\} \quad (\text{EQ. 2})$$

wherein cos( ) is the cosine function and A TAN 2[ ] is the inverse tangent function with two arguments. The amplitude and phase of the collective cross-axial dipole are $C\ I_1 \sqrt{1+B^2+2B\cos(\varphi)}$ and A TAN 2[B sin($\varphi$), 1+B cos($\varphi$)], respectively.

The collective magnetic moment in an axial direction is:

$$M_z = A\ I_1[\sin(\omega t) - B\ \sin(\omega t + \varphi)] \quad (\text{EQ.3})$$

wherein z is the axial axis defined by the axial slots in the X-Z steerable antenna 154, $M_z$ is the total magnetic dipole moment in the z direction, $A\ I_1$ is the amplitude of the total magnetic dipole moment in the z-direction powered by the first current.

Each axial ferrite rod is powered by either the first current or the second current, but not by both. The first term on the right hand side of EQ. 3 is the total axial magnetic moment powered by the first current. The second is by the second current. The minus sign between the two terms is the result of the two cross-axial dipole components powered by the two currents being additive, the two axial dipole components powered by the two currents are subtractive, and vice versa. This property is determined by the steerable wire routes by design. Therefore, the two signs between the two terms in EQS. 1 and 3 are opposite. Which of the two signs is plus is a choice on how the relative phase between the two currents is defined. If the relative phase between the two currents is defined to be $\varphi+180$ instead of $\varphi$, then the two signs in EQS. 1 and 3 are reversed. Both choices on relative phase are equally valid. Antenna property and behavior do not depend on which choice is used in the equations. Hereinafter, the relative phase between the two currents is the $\varphi$ used in EQS. 1 and 3. The phase of the collective axial dipole is also defined as being relative to that of the first current.

EQ. 3 can be rewritten as:

$$M_z = A\ I_1 \sqrt{1+B^2-2B\cos(\varphi)}\ \sin\{\omega t + A\ \text{TAN}\ 2[-B\ \sin(\varphi), 1-B\ \cos(\varphi)]\} \quad (\text{EQ. 4})$$

The amplitude and phase of the collective axial dipole are $A\ I_1 \sqrt{1+B^2-2B\cos(\varphi)}$ and A TAN 2[−B sin($\varphi$), 1−B cos($\varphi$)] respectively. The relative phase between the collective cross-axial dipole and the collective axial dipole is A TAN 2[B sin($\varphi$), 1+B cos($\varphi$)]−A TAN 2[−B sin($\varphi$), 1−B cos($\varphi$)].

The total collective dipole vector is a vector sum of $M_x$ and $M_z$ in order to have a magnetic dipole in a constant direction (a linear dipole), the relative phase between the cross-axial component $M_x$ and axial component $M_z$ must be zero or a multiple of 180 degrees. As such:

$$A\ \text{TAN}\ 2[B\ \sin(\varphi), 1+B\ \cos(\varphi)] - A\ \text{TAN}\ 2[-B\ \sin(\varphi), 1-B\ \cos(\varphi)] = n\pi \quad (\text{EQ. 5})$$

wherein n=0, ±1 and $\pi$ is the Archimedes' constant (the ratio of a circle's circumference to its diameter).

EQ. 5 is applicable only when neither $M_x$ nor $M_z$ has a zero amplitude. When the amplitude of $M_z$ is zero the resulting collective dipole is a linear dipole in a cross-axial direction regardless of its phase. Similarly, when the amplitude of $M_x$ is zero the resulting collective dipole is a linear dipole in an axial direction regardless of its phase. It can be proven that the necessary and sufficient condition for either $M_x$ or $M_z$ to have a zero amplitude is (B=1 and sin($\varphi$)=0). The (B=1 and $\varphi$=0 degrees) condition results in the transmitter being a cross-axial dipole with zero axial dipole moment. The (B=1 and $\varphi$=180 degrees) condition results in the transmitter being an axial dipole with zero cross-axial dipole moment.

If B=1 and sin($\varphi$)≠0, then the relative phase between the two dipole components is 90 or −90 degrees. EQ. 5 is thus violated. Therefore, the (B=1 and sin($\varphi$)≠0) condition leads to the transmitter being a nonlinearly-polarized dipole. The resulting transmitter is an elliptically polarized magnetic dipole. The eccentricity of the ellipse is a function of the relative phase $\varphi$ between the first current and the second current. When $$\varphi = \pm 2\ \text{ATAN}\left(\sqrt{\frac{C}{A}}\right)$$

where A TAN( ) is the inverse tangent function, the ellipse becomes a circle. The transmitter becomes a circularly polarized magnetic dipole antenna. When sin($\varphi$) is zero. the ellipse degenerates into a line. The resulting transmitter is a linearly polarized dipole. For B=1 the transmitter can be made into an elliptically polarized magnetic dipole when sin($\varphi$)≠0, or a linearly polarized magnetic dipole in a cross-axial direction when $\varphi$=0, or a linearly-polarized magnetic dipole in an axial direction when $\varphi$=180 degrees. To make a steerable transmitter into a linearly polarized magnetic dipole antenna in a direction between the axial and cross-axial axes the two wire currents must be different.

For B≠1 EQ. 5 gives us $$\frac{2B\sin(\varphi)}{1-B^2} = 0 \text{ for } B \neq 1. \quad (\text{EQ.6})$$

There are four solutions to EQ.6: B=0; B=∞; $\varphi$=0; and $\varphi$=180 degrees. B being zero means that the second current is zero and the first current is non-zero. The resulting transmitter is a slanted linear dipole. The slant angle of the dipole relative to the axial axis is $$\text{ATAN}\left(\frac{C}{A}\right).$$

B being infinite indicates that the first current is zero and the second current is non-zero. The resulting transmitter is a slanted linear dipole with a slant angle of $$\pi - \text{ATAN}\left(\frac{C}{A}\right).$$

A linear dipole with a slant angle at $$\pi - \text{ATAN}\left(\frac{C}{A}\right)$$

in the X-Z plane is a linear dipole at $$-\text{ATAN}\left(\frac{C}{A}\right)$$

wan a 180 degree phase difference. The route of wire 114 and route of wire 114a in the routes of the steerable antenna 154 are identical except that they are 180 degrees apart azimuthally about the antenna cylindrical axis. The azimuthal angle of a tool about its cylindrical axis (drill string axis) is termed tool face. Rotating the antenna cylinder by 180 degrees in tool face, the two wire routes switch positions. Because the axial slot structure and ferrite rods are identical among themselves, the amplitude ratio between the total cross-axial and axial dipoles when only current 2 is non-zero (B=∞) is the same as that when only current 1 is non-zero (B=0). The absolute values of the slant angles in those two cases are the same. The only difference between the two cases is that the two slanted dipoles are 180 degrees apart both in tool face and in dipole phase. The ratio $$\frac{C}{A}$$

is independent of the amplitude of the wire current. It is determined by the steerable antenna structure.

When φ=0 the X-Z steerable antenna 154 becomes a linearly-polarized magnetic dipole with a slant angle $$\theta_s = \text{ACOS}\left[\frac{A(1-B)}{\sqrt{C^2(1+B)^2 + A^2(1-B)^2}}\right]$$

from the cylindrical axis of the steerable antenna 154, wherein A COS( ) is the inverse of cosine function. The slant angle is a function of B. B can be chosen to be a value in the domain [0, +∞). The range of $\theta_s$ is between $$\text{ACOS}\left[\frac{A}{\sqrt{C^2 + A^2}}\right] \text{ and } \pi - \text{ACOS}\left[\frac{A}{\sqrt{C^2 + A^2}}\right].$$

When φ=180 degrees the steerable antenna 154 is a linearly-polarized magnetic dipole with a slant angle $$\theta_s = \text{ASIN}\left[\frac{C(1-B)}{\sqrt{C^2(1-B)^2 + A^2(1+B)^2}}\right]$$

from the cylindrical axis of the steerable antenna 154, wherein A SIN( ) is the inverse of sine function. The range of $\theta_s$ is between $$-\text{ACOS}\left[\frac{A}{\sqrt{C^2 + A^2}}\right] \text{ and } \text{ACOS}\left[\frac{A}{\sqrt{C^2 + A^2}}\right].$$

By choosing φ to be either 0 or 180 degrees, the slant angle $\theta_s$ can be made to be anywhere between $$\text{ACOS}\left[\frac{A}{\sqrt{C^2 + A^2}}\right] \text{ and } \pi - \text{ACOS}\left[\frac{A}{\sqrt{C^2 + A^2}}\right].$$

The entire range of the slant angle is 180 degrees. A linearly-polarized magnetic-dipole antenna in any direction in the X-Z plane can be embodied in the steerable antenna 154. For example, by setting B to be $$\frac{|C - A|}{C + A}$$

and φ to be 0 if A≥C or 180 degrees if A<C the steerable antenna 154 depicted in FIG. 18 embodies a linear dipole antenna with a slant angle of 45 degrees from the cylindrical axis of the antenna segment.

A receiving linearly-polarized magnetic dipole antenna can be embodied in a steerable antenna in the same way as a transmitting magnetic dipole antenna with the same linear-polarization property. A set of (B, φ) that makes a transmitting steerable antenna a slant linearly-polarized magnetic dipole makes a receiving steerable antenna a magnetic dipole with the same linear polarization and slant angle. As such, embodiments herein can be applied to the steerable antenna to create an axial dipole, or a cross-axial dipole, or a slant linearly-polarized dipole, or an elliptically-polarized dipole receiver.

Figure 19:
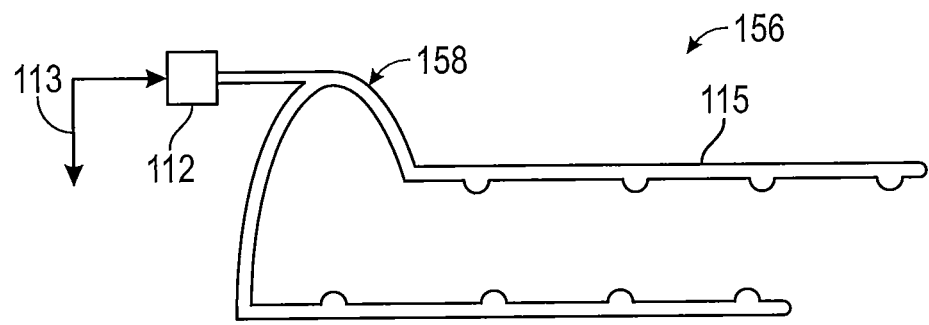
FIG. 19 is a diagram of the antenna wire in a cross-axial antenna.
Figure 20:
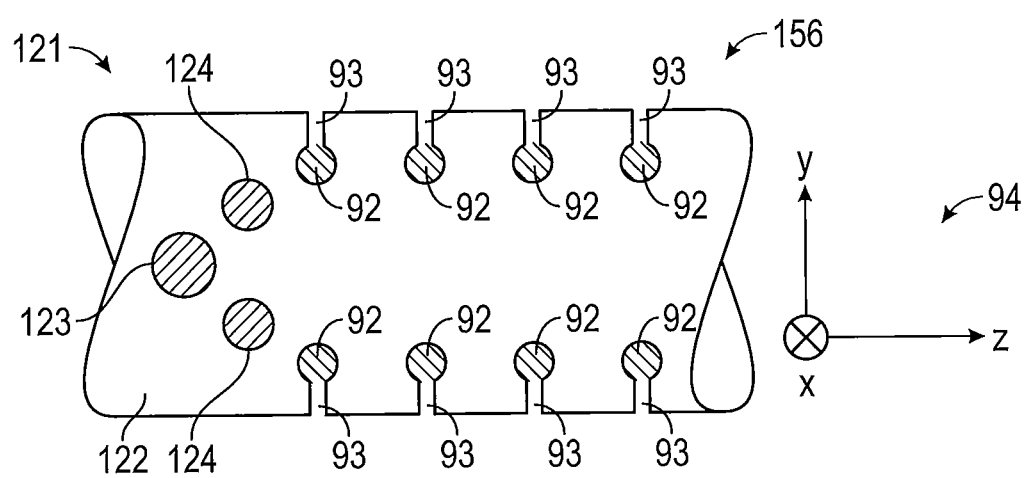
FIG. 20 is a side view of the bare steel structure of a cross-axial antenna section.

Embodiments herein can be used to construct a pure cross-axial antenna without any axial component. FIGS. 19 and 20 illustrate an exemplary pure cross-axial antenna 156. The steel structure and other parts are very similar to those of X-Z antenna combo 152 except only one arc wire section 158 is provided. The steel structure is not shown in the figure. The ferrite rods (not shown) are placed in the cross-axial slots in the straight sections and are sandwiched between the two wire segments in each slot. There is no slot in the arc section of the wire. There is no axial component in this design.

FIG. 20 shows the side view of the pure cross-axial antenna 156 in FIG. 19. The arc section of the wire-hole is embedded and can't be seen. A tuning circuit 112 is positioned in a tuning port 123, and accessed during the construction process of the pure cross-axial antenna 156. A metal cover may be used to protect the tuning port 123. Optional holes 124 may be drilled radially inward from the sub surface to reach the arc wire section 158. During the manufacturing process, the holes 124 may be used to help threading antenna wire through the arc wire section 158. Then these holes 124 may be screwed or plugged with conducting material. These holes 124 are generally not functioning parts of the pure cross-axial antenna 156 and may be used only during the manufacturing and maintenance phase, for example.

Measurements from a pair of axial transmitter-receiver antennas on a LWD tool are invariant under tool face rotation. The measurements can't be used to sense the azimuthal variations of formation properties about drill string axis. Measurements from a pair of transmitter-receiver antennas where one antenna is axial and the other is cross-axial can be sensitive to tool face angle of the cross-axial axis. Some azimuthal variations of formation properties can be determined from the measurements. If a formation is not azimuthally invariant, then the receiver reading is a function of the tool face of the cross-axial axis. By measuring the tool face angle for each receiver reading, a receiver data distribution can be obtained over tool face after the tool has rotated at least 360 degrees. A transmitter-receiver antenna pair with both being in cross-axial directions produces measurements sensitive to azimuthal variations of formation property.

Each resistivity measurement is made with a constant sampling window. Measurements are made on constant time-intervals. The rotational speed of a drill string can vary during drilling operations. A constant time interval between measurements does not translate into a constant tool face increment. The data distribution over tool face can be on unevenly-spaced tool face angles. For convenience of data processing and interpretation, the data distribution over tool face is often obtained or transformed into data on constantly-spaced tool face grids or bins. The transformation is accomplished by dividing the entire 0 to 360 degree tool-face space into multiple equal-sized bins. A receiver reading is assigned to a bin where the tool face angle at the time of the reading lies. If multiple readings fall into a bin, then all the readings in that bin are averaged into a reading for that bin. After measurement data has been collected for all bins, one set of data distribution over tool face is obtained. The complete set of binned data may be directly stored along with the time (cycle time) at the middle of the measurement cycle for the complete set of binned data. The set of binned data may be further processed and the results of processing along with the cycle time are stored in memory. Then, all bins are cleared for the next set of distribution data. The variable drill-string rotational speed causes the measurement cycle to be variable. The measurement cycle is managed dynamically by resistivity tool's electronic system.

The measurement data distributions over tool face in binned format can be directly used for an image log which is a two-dimensional plot over well depth and tool face angle. A distribution over tool face is plotted at the average depth of a tool during the time period when data in all the bins are collected for the distribution. The average depth is the tool depth at the cycle time. Time-to-depth correlation is performed by a logging system that includes a resistivity tool.

The frequencies used by LWD tools are much higher than the rotational frequency of a drill string during drilling process. For modeling tool response and data interpretation for a tool at a tool face angle, the tool may be considered to be stationary at that position.

Electromagnetic field generated by a transmitter on a wave propagation resistivity tool is a linear field and possesses the superposition property. A cross-axial transmitter dipole is a vector in the X-Y plane in a Cartesian coordinate system stationary with respect to Earth (well frame) where z-axis is the cylindrical axis of the antenna cylinder and drill string. At any tool face the dipole can be viewed as a vector consisting of two component vectors in the X and Y direction. The dipole is the vector sum of the two component vectors. Namely the dipole vector is given by $$\vec{D}(\varphi) = \cos(\varphi) D\,\hat{x} + \sin(\varphi) D\,\hat{y} \qquad (\text{EQ. 7}),$$

where $\varphi$ is the tool face angle of the cross-axial transmitter, $\vec{D}(\varphi)$ is the transmitter dipole vector at tool face $\varphi$, D is the dipole moment of the transmitter, $\hat{x}$ and $\hat{y}$ are unit vectors of the X and Y axes of the well frame, respectively.

The superposition principle dictates that the electromagnetic field generated by a cross-axial transmitter dipole at a tool face angle is the same as the vector sum of fields separately generated by the two component vectors, respectively. The axial component of the field on the z-axis some distance away measured by an axial dipole receiver is $$V(\varphi) = \cos(\varphi) V_{zx} + \sin(\varphi) V_{zy} \qquad (\text{EQ. 8}),$$

where $V(\varphi)$ is the complex receiver voltage representing phase and amplitude when the cross-axial transmitter is at tool face angle $\varphi$, $V_{zx}$ and $V_{zy}$ are axial receiver voltages when the tool face of the cross-axial transmitter are at zero and ninety degrees, respectively.

The receiver voltage of a cross-axial receiver on electromagnetic field generated by an axial transmitter dipole is also a simple sinusoidal function of tool face similar to that of EQ. 8.

The receiver measurement from an axial and cross-axial transmitter-receiver pair varies with tool face as a sinusoidal function. As a Fourier series of tool face the measurement only has two non-zero coefficients.

The measurement by a slanted linear magnetic dipole receiver on electromagnetic field generated by a slanted linear magnetic dipole transmitter is given by $$V(\varphi) = [\cos(\varphi + \varphi_R)\,\sin(\theta_R)\ \ \sin(\varphi + \varphi_R)\,\sin(\theta_R)\ \ \cos(\theta_R)] * \begin{pmatrix} V_{xx} & V_{xy} & V_{xz} \\ V_{yx} & V_{yy} & V_{yz} \\ V_{zx} & V_{zy} & V_{zz} \end{pmatrix} \begin{bmatrix} \cos(\varphi + \varphi_T)\,\sin(\theta_T) \\ \sin(\varphi + \varphi_T)\,\sin(\theta_T) \\ \cos(\theta_T) \end{bmatrix}, \qquad (\text{EQ.9})$$

where $\varphi$ is tool face angle, $(\theta_R, \varphi_R)$ are receiver slanted angle and tool face offset, $(\theta_T, \varphi_T)$ are transmitter slanted angle and tool face offset, matrix element $V_{ij}$ is the receiver voltage if the receiver is in i-direction and the transmitter is in j-direction in a well frame.

The matrix V in EQ. 9 is termed the transfer matrix or transfer function. It can be proven that the coefficients of Fourier transform of $V(\varphi)$ for third and all higher order harmonics in tool face angle $\varphi$ are zero. There are at most five non-zero coefficients in a Fourier series for receiver measurements over tool face for a pair of linear magnetic dipole transmitter and receiver. Thus, the tool face variation of a receiver voltage can be characterized by a function with at most five complex parameters. The minimum number of bins required for extracting the five parameters is five.

With five bins, each bin spans seventy-two degrees in tool face. The tool face angle of a piece of data may be anywhere within this tool face interval. The error from sampling jitter can be substantial (e.g., thirty-six degrees in tool face). By using more bins than the necessary (e.g., minimum of five in the data binning process), the jitter error is reduced. Oversampled data also reduces random measurement error. Increasing the number of bins will increase data storage requirement. The choice for the number of bins is a balance between minimizing jitter and random errors and minimizing data storage requirement.

In some embodiments, each bin is divided into multiple smaller sub-bins. After data for all the sub-bins in every bin are collected, the data collection for one tool face distribution is deemed complete. The data from all the sub-bins in a bin are averaged or summed to be the data for the bin. Only this data may be stored. As such, the sub-bin size limits the jitter error. The high number of sub-bins may also reduce random error. The small number of bins does not burden the data storage system.

In some embodiments, receiver measurement, as well as the tool face angle at which the receiver measurement is made, is temporarily recorded during the measurement process. After data has been collected for all the bins, the complete set of binned data is either stored into memory or processed into Fourier series coefficients (Fourier decomposition) to be stored into memory. Since the tool face angles are not on uniformly-spaced grid, the Fourier decomposition is performed using a technique designed for irregularly sampled data. As discussed herein, Fourier coefficients for third or higher order harmonics are zero for measurement from each linear dipole transmitter-receiver pair. There are only five non-zero coefficients. These five non-zero coefficients can be determined in a direct data-fitting optimization method such as the least-squares. Since the precise value of the tool face angle associated with each receiver measurement is used there is no jitter error. The number of bins or sub-bins does not have to be large to minimizing jitter error. A set of coarse bins can be used.

Random noise and other errors in binned data can cause the Fourier coefficients for third and higher order harmonics to be non-zero. The third or higher order Fourier coefficients maybe computed and stored into memory. The value of those coefficients can be used to gauge the measurement quality of binned data.

Five or more measurements over tool face angle may be used to determine the possible five non-zero Fourier coefficients. If the measurements are over a small range of tool face (azimuthal angle), then the underline azimuthal variation to be measured may be small compared with the system measurement error. The signal-to-noise ratio may be poor. By requiring measurement data present in each bin this problem is avoided in this embodiment.

In a directional well gravity tool face is used for tool face measurement. It is given by:

$$\varphi = A\ \text{TAN}\ 2(G_y, -G_x) \tag{EQ. 10}$$

where $G_x$ and $G_y$ are gravity components in the cross-axial X and Y directions in a Cartesian coordinate system fixed on the tool segment (sensor frame) with drill string axis as the Z-axis. The gravity components are measured by accelerometers in a directional sensing system when the drill string is at rest. This is done during the pipe change period when a drill string segment is added to or removed from the drill string and the downhole section of the drill string is at rest.

In some embodiments, magnetic tool face is dynamically measured during the drilling process. Gravity tool face is obtained from the magnetic tool face. Magnetic tool face is measured by magnetometers and the measurement is unaffected during the drilling process by mechanical factors which destroy gravity measurements using accelerometers. Magnetic tool face $\varphi_m$ is $$\varphi_m = A\ \text{TAN}\ 2(-M_y, M_x) \tag{EQ. 11}$$

where $M_x$ and $M_y$ are Geomagnetic field components in X and Y cross-axial directions in the sensor frame, respectively.

The difference between magnetic and gravity tool faces $\varphi - \varphi_m$ is a function of the dip angle of the Geomagnetic field, the inclination and azimuth of the drill string segment where a directional sensor is located. It is not a function of tool face. It is unchanged as the drill string rotates if the attitude of the drill string remains the same. In this embodiment the instantaneous gravity tool face of the x-axis of a magnetometer used for the dynamic measurement of the Geomagnetic field is given by:

$$\varphi = \varphi_m + (\varphi - \varphi_m)_{Last\ Survey} \tag{EQ. 12},$$

where $\varphi$ and $\varphi_m$ are the instantaneous gravity and magnetic tool faces while a drill string is rotating, $(\varphi - \varphi_m)_{LastSurvey}$ is the stationary gravity and Geomagnetic tool face difference obtained from the latest directional sensor survey conducted during a pipe change period when the drill string is at rest. The approximation used in deriving EQ. 12 is that between two stationary surveys the attitude of the drill string and the well changes very little. The gravity tool face error associated with this approximation is much smaller than the tool face accuracy requirement for data binning.

The magnetometers used for dynamically measuring geomagnetic field components in cross-axial directions during the drilling process may not be the same ones used for stationary directional survey. The two sets of cross-axial magnetometers maybe azimuthally misaligned about the drill string axis. The EQ. 12 is still valid and may be used to obtain the gravity tool face angle of the cross-axial X-axis of the dynamic magnetometer system.

The cross-axial component of a linear dipole antenna may be offset in tool face from the X-axis of the sensor frame of a dynamic magnetometer system. This offset is a known constant. The instantaneous gravity tool face of the cross-axial component of an linear dipole antenna is:

$$\varphi_g = \varphi_m + (\varphi - \varphi_m)_{Last\ Survey} + \Delta\varphi \tag{EQ. 13},$$

wherein $\varphi_g$ is the gravity tool face of the cross-axis of the antenna and $\Delta\varphi$ is the tool face offset between the X axes of the antenna and the dynamic magnetometer system.

Directional sensor systems may be part of the electronic system of a resistivity tool with cross-axial antenna components. Cylindrical sections housing the directional sensor system may be part of a resistivity tool segment.

Prior art LWD tools with cross-axial antennas have been used to measure one or more parameters of formation properties. A LWD tool with cross-axial antennas using embodiments described herein can be more efficient and more accurate than those of prior art.

Figure 21:
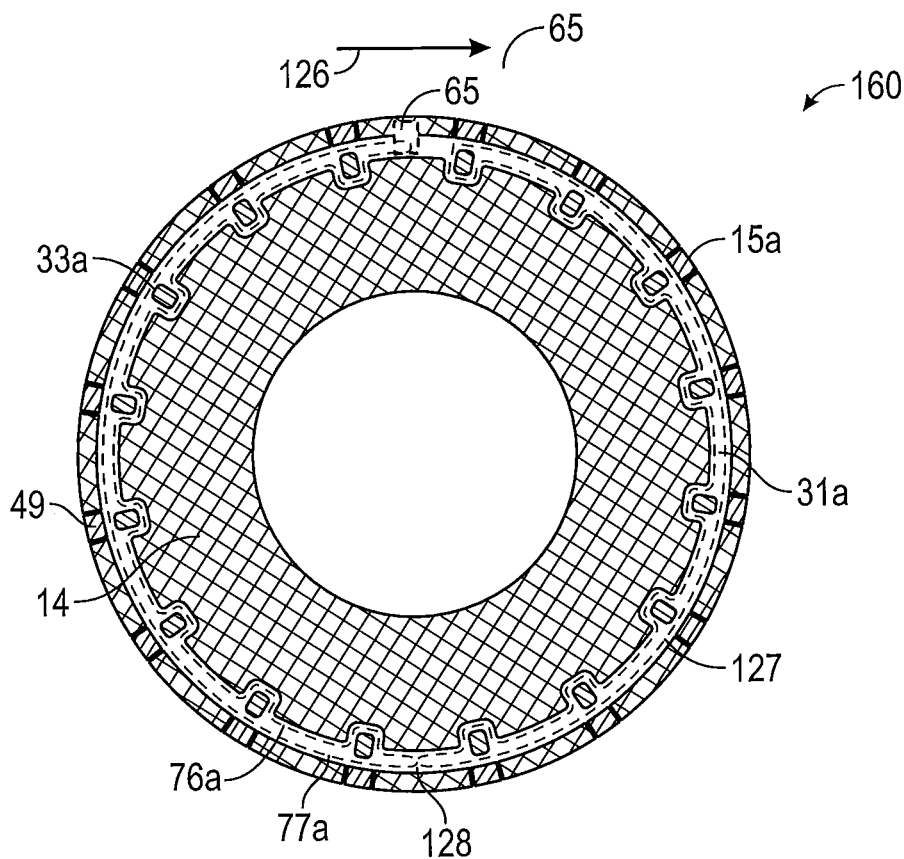
FIG. 21 is a cross-sectional view of a quadrupole antenna at the antenna wire section.

Referring to FIGS. 8 and 21, magnetic quadrupole antennas may be made with embodiments described herein conveniently as compared to the prior art. For example, in FIG. 8 by crossing the wires (a half-turn twist) in the wire hole diametrically opposite to a wire passageway 65 one obtains an antenna with one half of the point dipoles pointing in the opposite direction of the other half of point dipoles. The schematic cross-sectional view of an exemplary quadrupole antenna 160 is shown in FIG. 21. The quadrupole antenna 160 is similar to FIG. 8 except that two wires segments 76a and 77a in the wire hole 31a opposite to the wire passageway 65 is crossed at 128. The crossed section at 128 can be anywhere in that wire hole 31a. It can also be in a portion of the slot 15a adjacent to the wire hole 31a in FIG. 21. The cross-axial direction is shown as 126. The crossed section at 128 divides the ferrite rod 33a based dipoles into two groups. The left half of the ferrite dipoles in FIG. 21 are 180 degrees out of phase with the right half. The total dipole moment is zero. Te quadrupole moment is not zero. In a coordinate system where the Z-axis is the centerline of the sub cylinder, Y axis passes through the center of wire passageway 65 in FIG. 21, and X-axis is pointing in the direction of 126, the X-Z component of the quadrupole moment $Q_{xz}$ is given approximately by:

$$Q_{xz} = \frac{2R}{\pi} d\ N, \quad (EQ.\ 14)$$

wherein R is the radial distance from the middle of the ferrite rod 33a to the centerline of the steel sub, d is the axial magnetic dipole moment of each ferrite rod 33a construct, and N is the total number of ferrite rods 33a. The approximation used in obtaining EQ. 14 is that N is assumed to be large so that the ferrite rod dipoles are assumed to be uniformly and continuously distributed circumferentially. For exact value the factor $$\frac{2R}{\pi}$$

in EQ. 14 is replaced by the average of the absolute values of X-coordinates of all the ferrite rods 33a in this coordinate system if N is even and slots 15a are uniformly distributed as shown in FIG. 21.

The Z-X component $Q_{zx}$ equals to $Q_{xz}$ by the definition of quadrupole moments. All other components of the quadrupole tensor are zero.

By crossing antenna wire segments in the wire hole 31a not diametrically opposite of wire passageway 65, the antenna includes both a dipole and quadrupole moment. Multiple antenna wire crossings can be used to create an antenna with non-zero dipole and quadrupole moments centered on the cylindrical axis of a resistivity tool.

Figure 22:
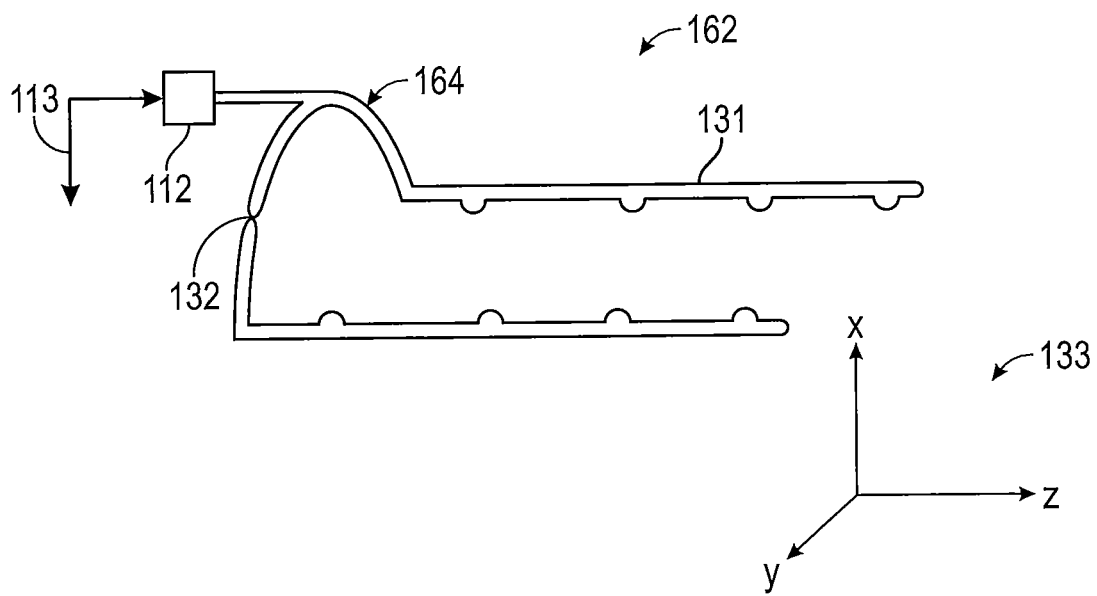
FIG. 22 is an antenna wire diagram of a quadrupole antenna.

FIG. 22 shows the schematic wiring diagram of an exemplary quadrupole antenna section 162 with cross-axial slots. The steel structure (not shown) with slots is almost identical to that of FIG. 20. The ferrite rods (not shown) are placed in the cross-axial slots in the straight sections and are sandwiched between the two wire segments in each slot. There is no slot in the arc section of the wire. Antenna wire 131 is a continuous wire that may be similar to the antenna wire 115 in FIG. 19 for pure cross-axial dipole antenna. Segments of the antenna wire 131 are crossed in an arc section 164 of the wire hole as shown at 132. The wire crossing 132 can be anywhere on the arc section 164 or the beginning of one of the straight sections before the first ferrite rod nearest to the arc section 164. The wire crossing 132 causes the two groups of ferrite dipoles on the two straight wire sections to be 180 degrees in polarity from each other. The total dipole moment is zero. In a coordinate system parallel to 133 with its origin located at the center between the two straight sections, the non-zero components of the quadrupole are:

$$Q_{xy} = Q_{yx} = \frac{l}{2} d\ N, \quad (EQ.\ 15)$$

wherein l is the distance between the two straight wire hole sections (l/2 is the radius of antenna sub cylinder minus the depth of the centerline of a ferrite rod from the sub surface), d is the dipole moment of a ferrite rod construct in the direction of the rod (X direction in coordinate system 133), and N is the total number of cross-axial ferrite rods in the two straight sections and is assumed to be even. All other components of the quadrupole are zero.

In some embodiments, another wire crossing similar to wire crossing 132 in FIG. 22 can be positioned to create two groups of dipoles where the numbers of slot based dipoles in them are unequal. The dipoles in each group are in phase and the two groups are 180 degrees out of phase. The total dipole moment is not zero. The antenna possesses both dipole and quadrupole moments. As in the case with axial dipoles, multiple wire crossings 132 can be used in an embodiment to create an antenna with all the moments centered on the resistivity tool cylindrical axis.

In prior art, the orientation of a wire hole section is important because a single wire segment in the section induces current around the wire hole structure and the induced current becomes an active part of an antenna. Antenna structures using embodiments described herein do not have strict requirements on the orientation of wire holes since there are two wire segments in a wire hole and the net current of the two segments is zero. Wire segments in wire holes do not participate in the transmitting or receiving function of an antenna built within embodiments described herein. The angle at which a wire segment crossing or passing through a ferrite rod may influence an antenna's behavior. Hereafter, unless specified otherwise it is assumed that a wire passes over/under a ferrite rod at a right angle to the major axis of the ferrite rod.

The two wire segments in a wire hole can be twisted a number of complete turns without altering the polarity of dipoles. A half-turn twist crosses the two wire segments and causes a polarity change in adjacent slots. It is understood that two wire segments maybe twisted in a wire hole to minimize any magnetic moment from the two segments.

Figure 23:
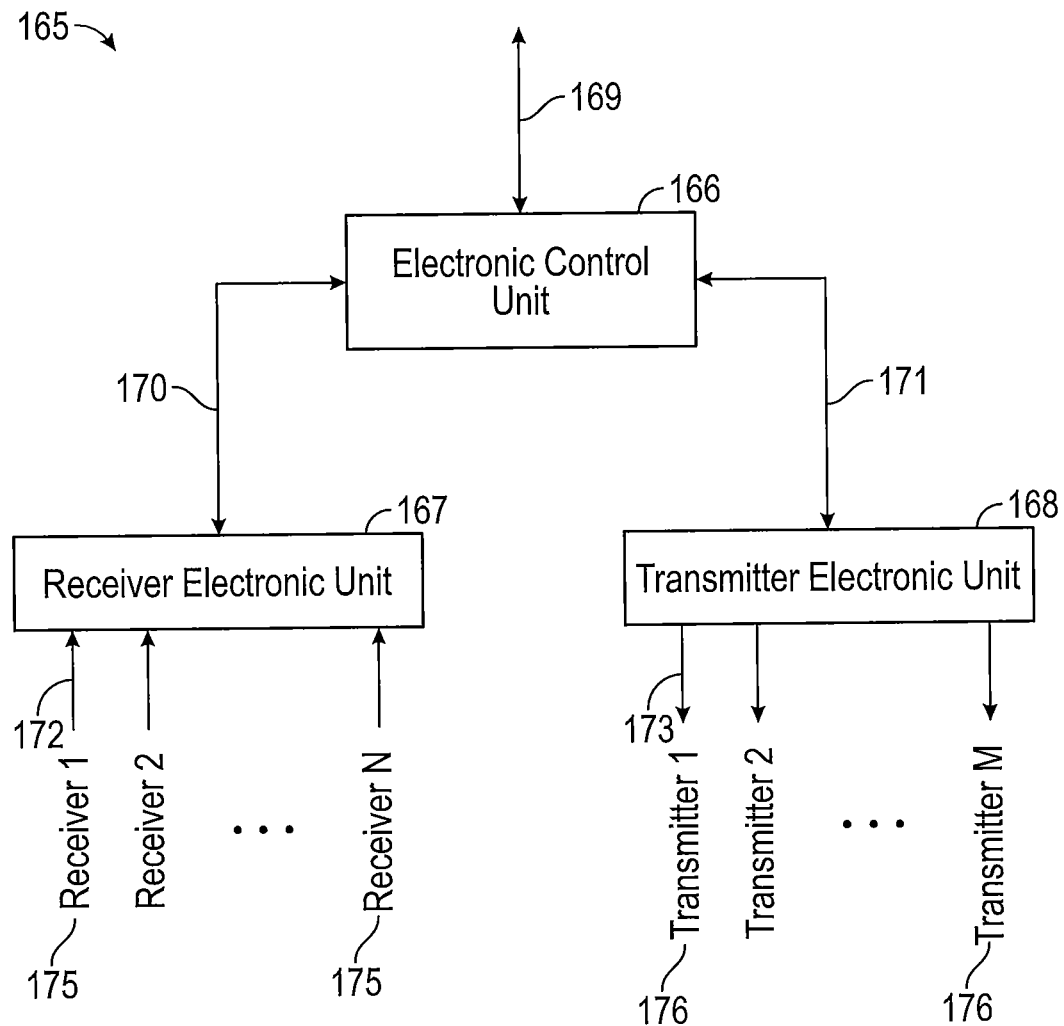
FIG. 23 is a schematic flow diagram of a transceiver electronics system in accordance with the present disclosure.

Referring to FIG. 23, the operation of a resistivity tool is managed by a transceiver electronic system 165. The transceiver electronic system 165 is housed in the tool's drill collar segments. The transceiver electronic system 165 may include an electronic control unit 166, a receiver electronic unit 167, and a transmitter electronic unit 168. Antenna tuning and signal measurement electronics of receivers are part of the receiver electronic unit 167. Receiver antennas 175 are connected to the receiver electronic unit 167 by electric wires 172. The electronic control unit 166 powers, controls, and collects receiver measurements from the receiver electronic unit 167 via an electric connection system 170. The electronic control unit 166 powers and commands the transmitter electronic unit 168 by a connection system 171. The transmitter electronic unit 168 comprises tuning circuits and other transmitter electronics. The transmitter electronic unit 168 powers transmitter antennas 176 by a connection system 173. FIG. 23 is a schematic functional diagram. In some embodiments, part of or the whole electronic control unit 166 and the receiver electronic unit 167 may be fabricated on a single electronic board. Part of transmitter electronic unit 168 may be on an electronic board where majority of the electronics for the electronic control unit 166 reside. In some embodiments, antenna tuning circuits of the receiver electronic unit 167 or transmitter electronic unit 168 are located next to the antennas 175 and 176 and are not on the electronic board for the rest of the unit which they are part of.

The electronic control unit 166 may connect to the rest of the downhole system via a connection system 169. The electronic control unit 166 may include a directional sensing subsystem. The transceiver electronics system 165 and antennas 175 and 176 may be housed in different sections of drill collars. Hereinafter, the collection of all the sections of drill collars for housing all the components of a resistivity tool may be called a drill collar segment.

It should also be understood that embodiments described herein also describe that wherein passing over/under a ferrite rod in a slot, a wire may wrap around the rod one or more times before leaving the slot. Wire twisting in a wire hole and wire wrapping of a ferrite rod in a slot may not change that the net current in a wire hole is zero and the net current forms complete loops around a ferrite rod.

Furthermore a ferrite or a ferrite rod may be made of a single volume of magnetic material or may consist of several pieces linearly concatenated together or packed in parallel.

While some embodiments have been shown and described, various modifications and substitutions may be made without departing from the spirit and scope of the invention.

Techniques for providing one or more antennae within a drilling assembly are disclosed in the following references, which are hereby incorporated by reference in their entirety:

U.S. Pat. No. 5,001,675 (March 1991), Woodward;
U.S. Pat. No. 5,138,263 (August 1992), Towle;
U.S. Pat. No. 5,331,331 (July 1994), Wu;
U.S. Pat. No. 5,491,488 (February 1996), Wu;
U.S. Pat. No. 5,530,358 (June 1996), Wisler, et al.;
U.S. Pat. No. 6,181,138 (January 2001), Hagiwara;
U.S. Pat. No. 6,163,155 (December 2000), Bittar;
U.S. Pat. No. 8,378,908 (February 2013), Wisler, et al.;
U.S. Pat. No. 8,471,563 (June 2013), Wisler, et al.;
U.S. Pat. No. 8,604,796 (December 2013), Wisler, et al.;
U.S. Pat. No. 9,140,817 (September 2015), Wisler, et al.;
U.S. Pat. No. 9,366,780 (June 2016), Wisler, et al.; and,
U.S. Pat. No. 9,885,800 (February 2018), Wisler, et al.

What is claimed is:

1. An electromagnetic wave propagation tool comprising:
an antenna system disposed on a drill collar segment, the antenna system including a magnetic dipole antenna comprising slot based magnetic dipoles, the slot based magnetic dipoles comprising:
 a plurality of wire holes positioned beneath an outer surface of the drill collar segment;
 at least two slots positioned in the outer surface of the drill collar segment, the wire holes connecting a plurality of slots with each other;
 a ferrite rod placed in each slot; and,
 a continuous antenna wire passing through slots and wire holes via a first route, the continuous antenna wire turning around and repassing through the slots and the wire holes via a second route such that two wire segments in each slot are positioned above and below each ferrite rod.

2. The electromagnetic wave propagation tool of claim 1, wherein the magnetic dipole antenna is a transmitter antenna.

3. The electromagnetic wave propagation tool of claim 1, wherein the magnetic dipole antenna is a receiver antenna.

4. The electromagnetic wave propagation tool of claim 1, wherein the slots and slot based magnetic dipoles are in an axial direction and are substantially uniformly distributed azimuthally about an axis of the drill collar segment, the slot based magnetic dipoles being at one axial location on the drill collar segment and are in phase forming a collective axial antenna.

5. The electromagnetic wave propagation tool of claim 1, wherein the slots and slot based magnetic dipoles are in an axial direction and are substantially uniformly distributed azimuthally about an axis of the drill collar segment.

6. The electromagnetic wave propagation tool of claim 1, wherein slots and slot based magnetic dipoles are in an axial direction and are disposed into three groups azimuthally distributed about an axis of the drill collar segment.

7. The electromagnetic wave propagation tool of claim 1, wherein the slots and slot based magnetic dipoles are parallel in a cross-axial direction and are in phase forming a collective cross-axial antenna, the electromagnetic wave propagation tool further comprising a subsystem for obtaining a tool face angle of the cross-axial axis.

8. The electromagnetic wave propagation tool of claim 7, wherein the slot based magnetic dipoles are disposed into two axially distributed groups positioned 180 degrees apart azimuthally about a center axis of the drill collar segment.

9. The electromagnetic wave propagation tool of claim 1, wherein the slots and slot based magnetic dipoles are in a cross-axial direction, and the continuous antenna wire is arranged such that two dipole groups of slot based magnetic dipoles are formed, the slot based magnetic dipoles in each group are in phase and the two dipole groups of slot based magnetic dipoles are 180 degrees out of phase.

10. The electromagnetic wave propagation tool of claim 1, wherein the slot based magnetic dipoles consist of two groups with a first group consisting of axial slot based dipoles and a second group consisting of cross-axial slot based dipoles in a cross-axial direction and are in phase, forming a collective slant antenna; and wherein the electromagnetic wave propagation tool further comprises a subsystem for obtaining a tool face angle.

11. The electromagnetic wave propagation tool of claim 10, wherein the first group of axial slot based dipoles are disposed at two axial dipole locations on the drill collar segment and the second group of cross-axial slot based dipoles are disposed on the drill collar segment in between the two axial dipole locations so that a center of collective axial dipole moment coincides with a center of collective cross-axial dipole moment.

12. The electromagnetic wave propagation tool of claim 10, wherein the electromagnetic wave propagation tool further comprises a transceiver electronics system configured to divide face space of the electromagnetic wave propagation tool into several bins and collecting and averaging receiver data in each bin.

13. The electromagnetic wave propagation tool of claim 12, wherein the transceiver electronics system further comprises subsystems for processing binned data into a data distribution over tool face angle.

14. The electromagnetic wave propagation tool of claim 12, wherein the transceiver electronics system further comprises subsystems for processing binned data into a parameter indicative of formation azimuthal properties.

15. The electromagnetic wave propagation tool of claim 12, wherein the transceiver electronics system further comprises subsystems for transforming binned data into coefficients of a Fourier series of tool face angle.

16. An electromagnetic wave propagation tool comprising:
- a transceiver electronics system disposed on a drill collar segment, the transceiver electronics system comprising a magnetic dipole based antenna having:
  - a plurality of slot based magnetic dipoles comprising at least two slots in an outer surface of the drill collar segment and wire holes beneath the outer surface of the drill collar segment, the wire holes connecting adjacent slots;
  - ferrite rods positioned in the slots;
  - a first continuous antenna wire routed through a first set of the slots via the wire holes in a first route and turns around to repass through the first set of the slots and wire holes via a second route, wherein two wire segments of the first continuous antenna wire in each slot are positioned above and below each ferrite rod within each slot, the first continuous antenna wire further connecting to and from the transceiver electronic system;
  - a second continuous antenna wire routed through a second set of the slots via the wire holes in a third route and turns around to repass through the second set of slots and wire holes in a fourth route, wherein two wire segments of the second continuous antenna wire in each slot are positioned above and below each ferrite rod within each slot, the second continuous antenna wire further connecting to and from the transceiver electronic system; and,
- wherein the transceiver electronics system further comprises a subsystem that maintains relative amplitude and phase between currents in the first continuous antenna wire and the second continuous antenna wire.

17. The electromagnetic wave propagation tool of claim 16, wherein relative amplitude and phase between the first continuous antenna wire and the second continuous antenna wire results in an axial dipole antenna.

18. The electromagnetic wave propagation tool of claim 16, wherein relative amplitude and phase between the first continuous antenna wire and the second continuous antenna wire results in a cross-axial dipole antenna.

19. The electromagnetic wave propagation tool of claim 16, wherein:
- the slots and wire holes are in a steerable antenna pattern;
- the first continuous antenna wire and the second continuous antenna wire follow steerable antenna routes; and,
- the transceiver electronics system further comprises a subsystem for obtaining a tool face.

20. A magnetic dipole based antenna for use an antenna system disposed on a drill collar segment, comprising:
- a plurality of slot based magnetic dipoles comprising at least two slots in an outer surface of the drill collar segment and wire holes beneath the outer surface of the drill collar segment, the wire holes connecting adjacent slots;
- ferrite rods positioned in the slots; and,
- a continuous antenna wire passing through slots and wire holes via a first route, the continuous antenna wire turning around and repassing through the slots and the wire holes via a second route such that two wire segments in each slot are positioned above and below each ferrite rod.

\* \* \* \* \*

UNITED STATES PATENT AND TRADEMARK OFFICE
CERTIFICATE OF CORRECTION

PATENT NO. : 12,119,536 B2
APPLICATION NO. : 18/190663
DATED : October 15, 2024
INVENTOR(S) : Jian-Qun Wu

It is certified that error appears in the above-identified patent and that said Letters Patent is hereby corrected as shown below:

In the Specification

Column 17, Line 32: Delete "$M_x = C\, l_1\sqrt{1 + B^2 + 2B\cos(\varphi)}\, \sin\{\omega t + A\ TAN2[B\sin(\varphi), 1 + B\cos(\varphi)]\}$" and replace with
-- $M_x = C\, l_1\sqrt{1 + B^2 + 2B\cos(\varphi)}\, \sin\{\omega t + ATAN2[B\sin(\varphi),\ 1 + B\cos(\varphi)]\}$ --

Column 17, Line 34: Delete "A TAN 2[ ]" and replace with -- ATAN2[ ] --

Column 17, Line 37: Delete "$A\ TAN2[B\sin(\varphi), 1 + B\cos(\varphi)]$" and replace with
-- $ATAN2[B\sin(\varphi), 1 + B\cos(\varphi)]$ --

Column 18, Line 3: Delete "$M_z = A\, l_1\sqrt{1 + B^2 - 2B\cos(\varphi)}\, \sin\{\omega t + A\ TAN2[-B\sin(\varphi), 1 - B\cos(\varphi)]\}$" and replace with
-- $M_z = A\, l_1\sqrt{1 + B^2 - 2B\cos(\varphi)}\, \sin\{\omega t + ATAN2[-B\sin(\varphi),\ 1 - B\cos(\varphi)]\}$ --

Column 18, Line 6: Delete "$A\ TAN2[-B\sin(\varphi), 1 - B\cos(\varphi)]$" and replace with
-- $ATAN2[-B\sin(\varphi), 1 - B\cos(\varphi)]$ --

Column 18, Line 8: Delete "$A\ TAN2[B\sin(\varphi), 1 + B\cos(\varphi)]$" and replace with
-- $ATAN2[B\sin(\varphi), 1 + B\cos(\varphi)]$ --

Column 18, Line 9: Delete "$-A\ TAN2[-B\sin(\varphi), 1 - B\cos(\varphi)]$" and replace with
-- $-ATAN2[-B\sin(\varphi), 1 - B\cos(\varphi)]$ --

Column 18, Line 16: Delete "$A\ TAN2[B\sin(\varphi), 1 + B\cos(\varphi)]-A\ TAN2[-B\sin((\varphi), 1 - B\cos(\varphi)] = n\pi$"
and replace with -- $ATAN2[B\sin(\varphi), 1 + B\cos(\varphi)]-ATAN2[-B\sin(\varphi), 1 - B\cos(\varphi)] = n\pi$ --
Column 18, Line 47: After "where" delete "A TAN( )" and replace with -- ATAN( ) --

Signed and Sealed this
Nineteenth Day of November, 2024

Katherine Kelly Vidal
*Director of the United States Patent and Trademark Office*

CERTIFICATE OF CORRECTION (continued)
U.S. Pat. No. 12,119,536 B2

Column 19, Line 29: Delete "wan" and replace with -- with --

Column 20, Lines 22-23: Delete "$ACOS\left[\frac{A}{\sqrt{C^2+A^2}}\right]$ and $\pi - ACOS\left[\frac{A}{\sqrt{C^2+A^2}}\right]$." and replace with -- $-ACOS\left[\frac{A}{\sqrt{C^2+A^2}}\right]$ and $\pi - ACOS\left[\frac{A}{\sqrt{C^2+A^2}}\right]$. --

Column 23, Line 55: Delete "$\varphi = A\ TAN2(G_y, -G_x)$" and replace with -- $\varphi = ATAN2(G_y, -G_x)$ --

Column 26, Line 6: Delete "(1/2" and replace with -- $(\frac{l}{2}$ --